US011854095B2

(12) United States Patent
Lin et al.

(10) Patent No.: US 11,854,095 B2
(45) Date of Patent: Dec. 26, 2023

(54) MODEL BUILDING DEVICE AND LOADING DISAGGREGATION SYSTEM

(71) Applicant: INSTITUTE FOR INFORMATION INDUSTRY, Taipei (TW)

(72) Inventors: Shu-Wei Lin, New Taipei (TW); Fang-Yi Chang, Keelung (TW); Yung-Chieh Hung, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 1250 days.

(21) Appl. No.: 16/217,332

(22) Filed: Dec. 12, 2018

(65) Prior Publication Data

US 2020/0167644 A1    May 28, 2020

(30) Foreign Application Priority Data

Nov. 26, 2018  (TW) .................................. 107142078

(51) Int. Cl.
| | |
|---|---|
| G06Q 50/06 | (2012.01) |
| G06N 3/08 | (2023.01) |
| G06N 3/049 | (2023.01) |
| G06F 17/15 | (2006.01) |
| G06F 30/20 | (2020.01) |
| G06F 18/214 | (2023.01) |

(52) U.S. Cl.
CPC ............ *G06Q 50/06* (2013.01); *G06F 17/15* (2013.01); *G06F 18/214* (2023.01); *G06F 30/20* (2020.01); *G06N 3/049* (2013.01); *G06N 3/08* (2013.01)

(58) Field of Classification Search
CPC .......... G06N 3/08; G06N 3/049; G06F 30/20; G06F 17/15; G06K 9/6256; G06Q 50/06
See application file for complete search history.

(56) References Cited

U.S. PATENT DOCUMENTS

| | | | |
|---|---|---|---|
| 9,104,189 B2 * | 8/2015 | Berges Gonzalez | ........................ G05B 19/0428 |
| 9,190,844 B2 * | 11/2015 | Tran | ..................... G06Q 50/163 |
| 2012/0290230 A1 * | 11/2012 | Berges Gonzalez | ... G01D 4/004 702/61 |

FOREIGN PATENT DOCUMENTS

WO   WO-2013145779 A2 * 10/2013 ............. G06F 17/10

OTHER PUBLICATIONS

Kelly, Daniel. Disaggregation of domestic smart meter energy data. Diss. Imperial College London (Year: 2016).*

(Continued)

*Primary Examiner* — Michael J Huntley
*Assistant Examiner* — Adam C Standke
(74) *Attorney, Agent, or Firm* — Birch, Stewart, Kolasch & Birch, LLP

(57) ABSTRACT

A model building device and a loading disaggregation system are provided. The model building device disaggregates total aggregated data outputted from a total electricity meter and measured during a unit processing period. The model building device includes a usage pattern-analyzing module, an information mapping module, and a time series-analyzing module. After receiving the total aggregated data, the usage pattern-analyzing module analyzes the total aggregated data based on detection conditions and generates usage pattern information accordingly. The information mapping module maps the usage pattern information to form encoded data. The time series-analyzing module analyzes time correlation of the encoded data to generate synthesized simulation data.

13 Claims, 12 Drawing Sheets

(56) References Cited

OTHER PUBLICATIONS

Liang, Jian, et al. "Load signature study—Part II: Disaggregation framework, simulation, and applications." IEEE Transactions on Power Delivery 25.2 (Year: 2009).*

Filippi, Alessio, et al. "Multi-appliance power disaggregation: An approach to energy monitoring." 2010 IEEE International Energy Conference. IEEE (Year: 2010).*

Wang et al., Nonintrusive load monitoring based on deep learning. In International Workshop on Data Analytics for Renewable Energy Integration (Year: 2018).*

* cited by examiner

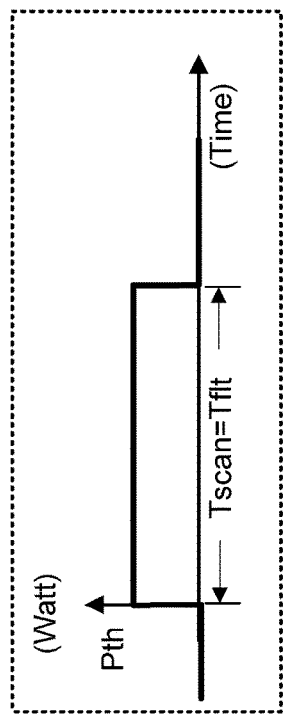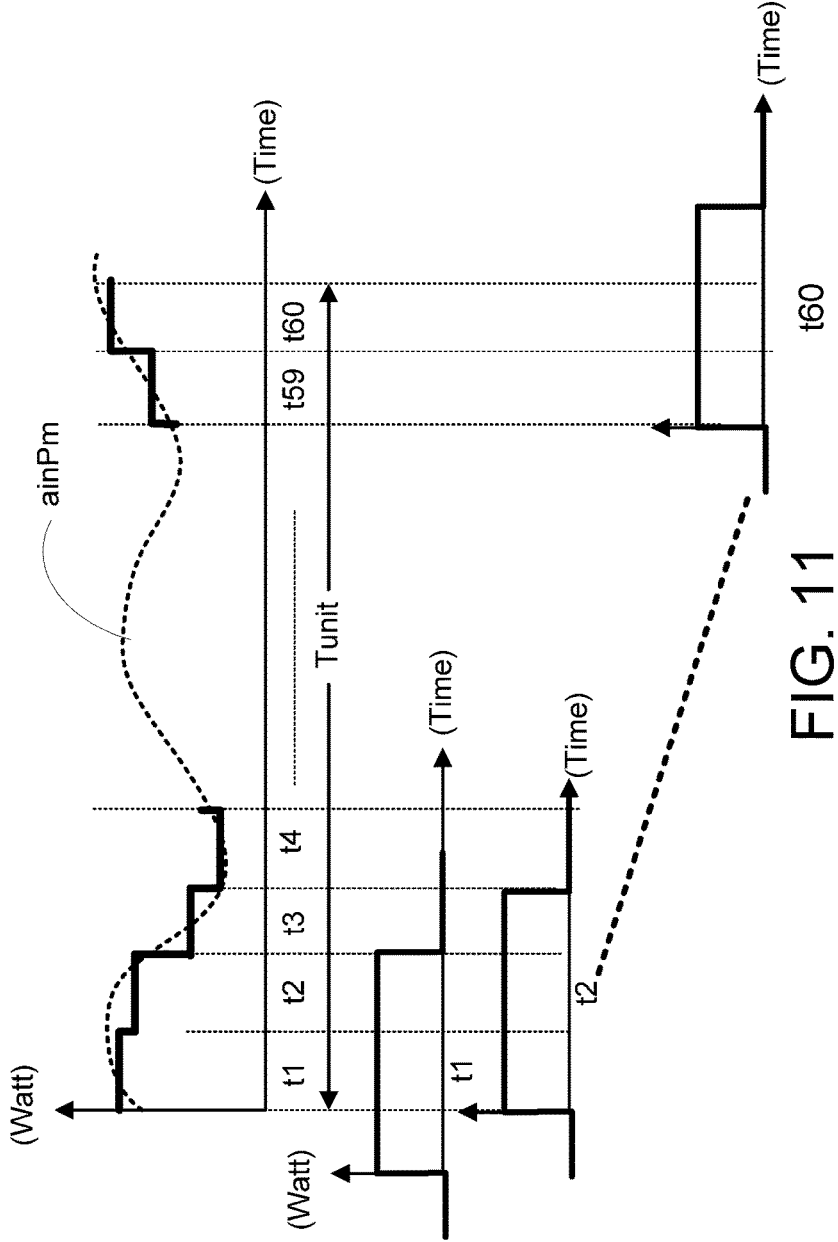

MODEL BUILDING DEVICE AND LOADING DISAGGREGATION SYSTEM

This application claims the benefit of Taiwan application Serial No. 107142078, filed Nov. 26, 2018, the subject matter of which is incorporated herein by reference.

BACKGROUND OF THE INVENTION

Field of the Invention

The invention relates in general to a model building device and a loading disaggregation system, and more particularly to a model building device and a loading disaggregation system for analyzing users' electricity usage behavior.

Description of the Related Art

With the development of technology, electricity demand is rapidly growing. To reduce the consumption of resources, power saving has been an important issue. For the public, the total electricity consumption could be inferred only from the electricity bill. If someone wants to know the electricity consumption of individual electrical appliances, each electrical appliance requires a respective smart meter. However, the smart meters are quite expensive, and it is impractical for the public to install smart meters on each electrical appliance.

SUMMARY OF THE INVENTION

The invention is directed to a model building device and a loading disaggregation system. The loading disaggregation system includes a data processing device, a model building device and a model evaluation device. The loading disaggregation system operates in a model building mode M1 and a model application mode M2 in sequence. In the model building mode M1, the model building device repetitively trains and tests the disaggregation model. After the model evaluation device verifies and confirms that the parameters of the disaggregation model have been well set up, the loading disaggregation system enters the model application mode M2. The model building device can disaggregate the aggregated data outputted from the total electricity meter to generate disaggregation results revealing the electricity consumption of individual electrical appliances.

According to a first aspect of the present invention, a model building device for disaggregating the aggregated data measured during a unit processing period and outputted from the total electricity meter is provided.

According to a second aspect of the present invention, a loading disaggregation system is provided.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 10 is a schematic diagram showing a time-frequency detector.

FIG. 11 is a schematic diagram showing an edge detector.

DETAILED DESCRIPTION OF THE INVENTION

To realize the electricity usage of household electrical appliances, the present invention provides a disaggregation model which can estimate the electricity usage (electricity consumption) behavior of a designated electrical appliance according to raw data outputted from a total electricity meter. The loading disaggregation system proposed in the embodiments according to the present invention takes advantage of nonintrusive load monitoring (NILM) technology. The disaggregation model can be applied to a large number of residences or electricity users to analyze the electricity usage behavior of the electrical appliances at a low cost.

In the specification, the loading disaggregation system operates in one of two modes, that is, model building mode M1 and model application mode M2. The electricity users involved in the model building mode M1 are defined as original electricity users, and the electricity users involved in the model application mode M2 are defined as ordinary electricity users. In the model building mode M1, the loading disaggregation system receives the raw data in connection with the original electricity users to determine and set the parameters of the disaggregation model. In the model application mode M2, the loading disaggregation system uses the disaggregation model with well fitted parameters to disaggregate the raw data in connection with the ordinary electricity users to acquire the electricity usage behavior. For illustration purposes only, four electrical appliances (electrical appliances A, B, C, and D) are exemplified in the specification to describe how the disaggregation model disaggregates the raw data to acquire the electricity usage behavior of the electrical appliances. The parameters related to the electrical appliances A, B, C, and D are marked with subscript characters a, b, c and d, respectively.

In practice, the sort and the quantity of the electrical appliances are not limited. For the ordinary electricity users, only total electricity meters are required to measure the total electricity consumption (represented by the relation between time and power (watt)), so that the cost is relatively low and the method is relatively convenient and easy. In the specification, the parameters related to the total electricity meters are marked with subscript character m. After building the disaggregation model, the electricity providers can provide the service of electricity usage analysis for lots of consumers by utilizing this disaggregation model.

Figure 1A:
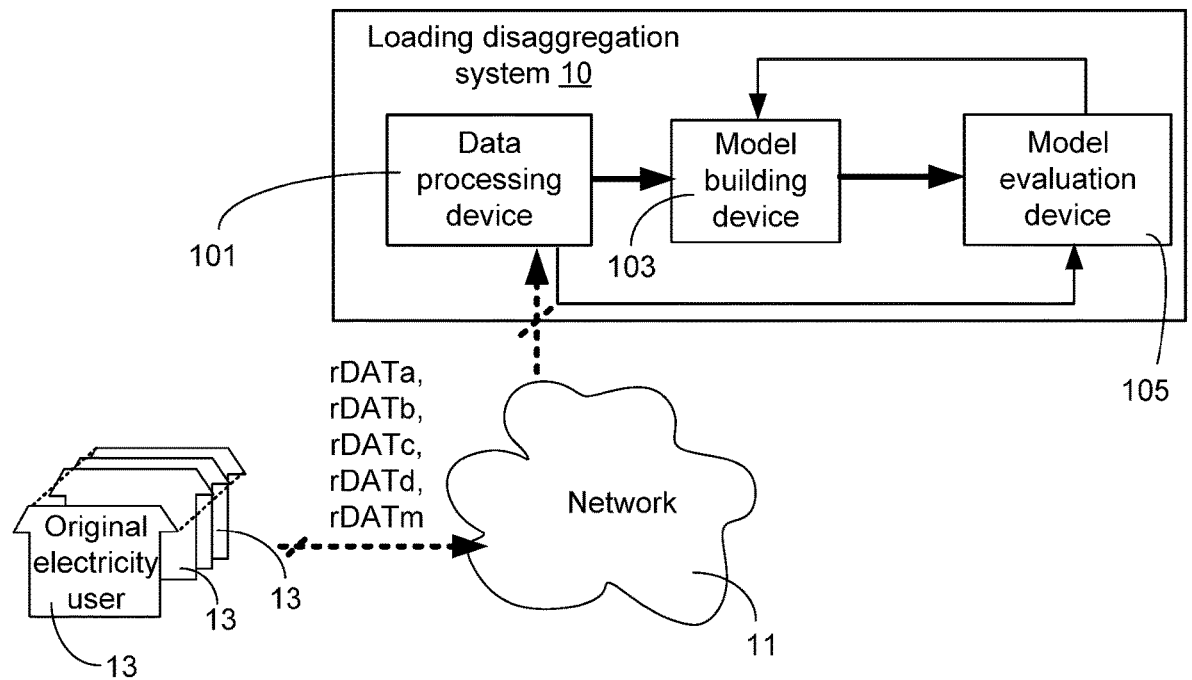
FIG. 1A is a schematic diagram illustrating a loading disaggregation system operating in a model building mode.
Figure 1B:
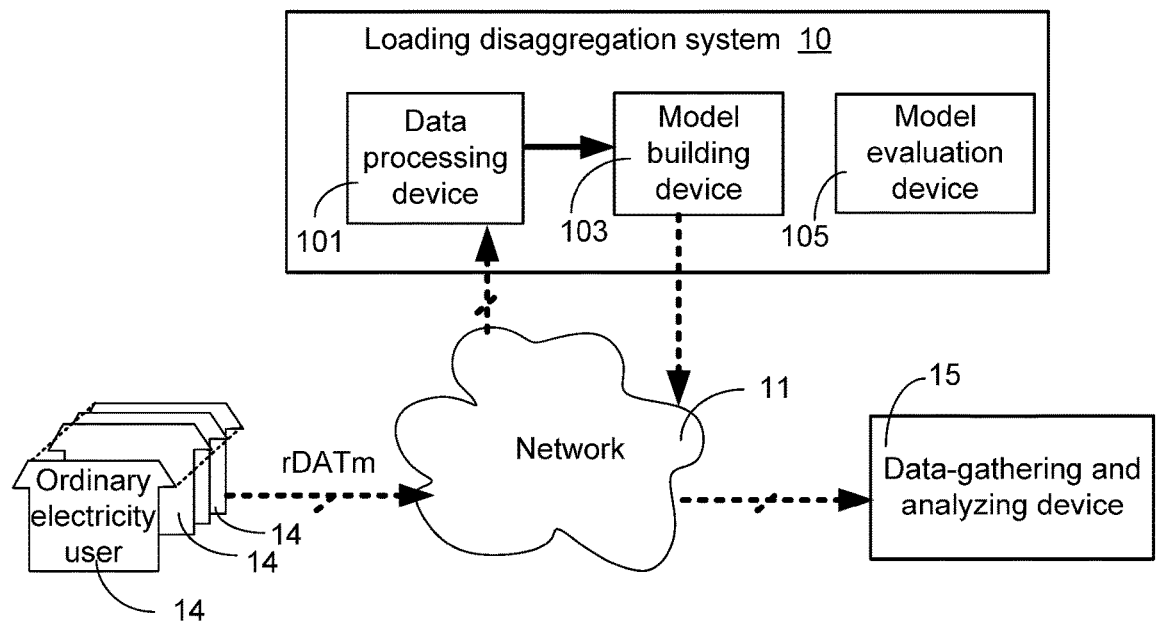
FIG. 1B is a schematic diagram illustrating the loading disaggregation system operating in a model application mode.

The following description together with FIG. 1A and FIG. 1B is given to show that the loading disaggregation system operates in the model building mode M1 and the model application mode M2, respectively. The loading disaggregation system 10 mainly includes a data processing device 101, a model building device 103 and a model evaluation device 105. The total electricity meters and/or the respective electricity meters corresponding to the electrical appliances A, B, C and D of the electricity users 13 and 14 are in communication with a network 11 to transmit measured raw data rDAT to the network 11. The data processing device 101 is in communication with the network 11, and the data processing device 101 is electrically connected to the model building device 103 and the model evaluation device 105. The model building device 103 and the model evaluation device 105 are electrically connected to each other.

Please refer to FIG. 1A, a schematic diagram illustrating the loading disaggregation system operating in the model building mode M1. The electricity provider installs smart meters including respective electricity meters on the electrical appliances A, B, C and D and total electricity meters in the houses of the original electricity users. In the model building mode M1, the loading disaggregation system 10 receives total raw data rDATm from the total electricity meters in connection with the original electricity users 13 and respective raw data rDATa, rDATb, rDATc and rDATd from the respective electricity meters in connection with the original electricity users 13.

Please refer to FIG. 1B, a schematic diagram illustrating the loading disaggregation system operating in the model application mode M2. In the model application mode M2, the loading disaggregation system 10 only receives the total raw data rDATm from the total electricity meters in connection with the ordinary electricity users 14, but does not receive the respective raw data rDATa, rDATb, rDATc and rDATd from the respective electricity meters in connection with the ordinary electricity users 14. In the model application mode M2, the electricity provider directly uses the disaggregation model to disaggregate the total raw data rDATm outputted from the total electricity meters in connection with the ordinary electricity users 14, and then estimates the electricity usage behavior of the electrical appliances A, B, C and D of the ordinary electricity users 14 based on the output of the disaggregation model.

In the model building mode M1, the loading disaggregation system 10 enables the data processing device 101, the model building device 103 and the model evaluation device 105. In the model application mode M2, the loading disaggregation system 10 enables the data processing device 101 and the model building device 103, and disables the model evaluation device 105. It is to be noted that when the loading disaggregation system 10 sets up the parameters of the disaggregation model, the operation includes the repetitive setting steps performed by the model building device 103, the repetitive validation steps performed by the model evaluation device 105, and the repetitive updating steps performed by the model building device 103, in order to find the proper parameters. Therefore, the model building mode M1 of the loading disaggregation system 10 further includes a training stage STG1 and a testing stage STG2. The loading disaggregation system 10 may operate at the training stage STG1 and the testing stage STG2 alternately.

The parameters of the disaggregation model may include structure parameters and auxiliary parameters. The structure parameters are fundamental parameters for processing data in the disaggregation model, and also called hyperparameters. The auxiliary parameters are coefficients (weights) for analyzing data in the disaggregation model.

When the loading disaggregation system 10 is at the training stage STG1, the model building device 103 updates the auxiliary parameters based on backward propagation according to an evaluation result outputted from the model evaluation device 105. If the evaluation result outputted from model evaluation device 105 indicates that the disaggregation model cannot achieve convergence, the model building device 103 will update the learning rate of the structure parameters. On the other hand, when the loading disaggregation system 10 is at the testing stage STG2, the model building device 103 adjusts the structure parameters according to the evaluation result outputted from the model evaluation device 105. The details of the structure parameters and the auxiliary parameters are described below.

Depending on the stage of the loading disaggregation system 10, the loading disaggregation system 10 further divides the raw data rDAT in connection with the original electricity users into two portions wherein one is raw training data, and the other is raw testing data. The raw training data is used at the training stage STG1 to update the auxiliary parameters of the disaggregation model. The raw testing data is used at the testing stage STG2 to inspect whether the structure parameters and the auxiliary parameters of the disaggregation model are viable for the testing dataset tstDSET.

In practice, the raw training data and the raw testing data about the electricity usage may correspond to the same original electricity users but with different measurement periods Tdet. Otherwise, the raw training data and the raw testing data about the electricity usage may correspond to different original electricity users with the same measurement period Tdet. The definition of the original electricity users and the related raw training data and raw testing data is not limited to the embodiments and can be adjusted as needed.

Figure 2:
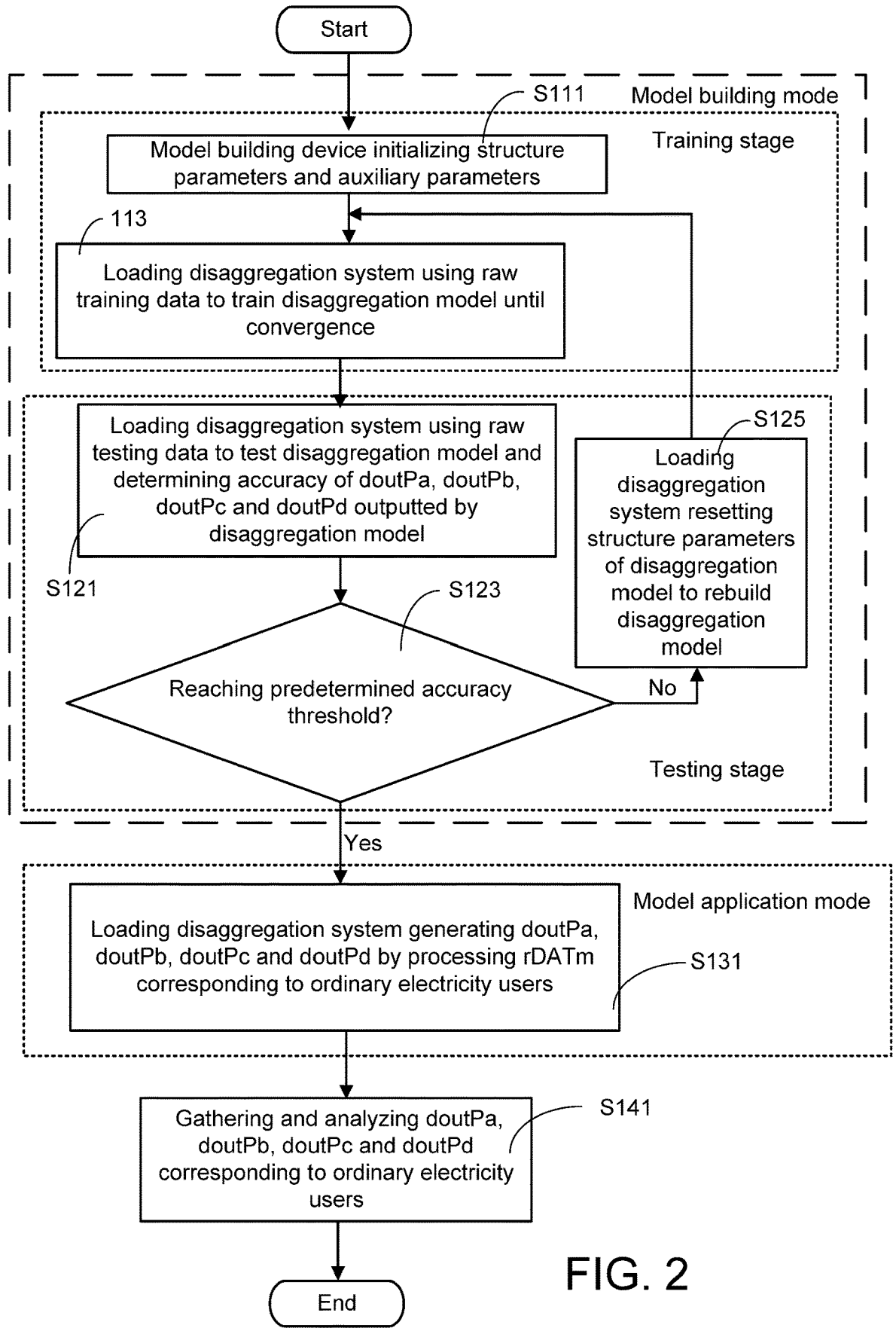
FIG. 2 is a flowchart illustrating the operation of the loading disaggregation system according to an embodiment of the present invention.

Please refer to FIG. 2, which is a flowchart illustrating the operation of the loading disaggregation system 10 according to an embodiment of the present invention. This flowchart briefly shows the process of the operation of the loading disaggregation system 10. Detailed description about each mode and stage of the loading disaggregation system 10 will be given below.

At first, the loading disaggregation system 10 is at the training stage STG1. At this time, the model building device 103 initializes the structure parameters and the auxiliary parameters of the loading disaggregation system 10 (step S111). Then, the loading disaggregation system 10 uses the raw training data to train and evaluate the disaggregation model until that the evaluation result indicates that the disaggregation model can generate a convergent disaggregation result (step S113). In this step, the model building device 103 updates the auxiliary parameters and/or the learning rate of the structure parameters. Subsequently, the loading disaggregation system 10 terminates the training stage STG1 and enters the testing stage STG2.

At the testing stage STG2, the loading disaggregation system 10 uses the raw testing data to test the disaggregation model. The model evaluation device 105 determines the accuracy of the synthesized simulation data doutPa, doutPb, doutPc and doutPd (step S121). After obtaining the accuracy of the synthesized simulation data doutPa, doutPb, doutPc, and doutPd, the loading disaggregation system 10 determines whether the accuracy reaches a predetermined accuracy threshold (step S123).

If it is determined that the accuracy does not reach the predetermined accuracy threshold in step S123, it reveals that the setting of the auxiliary parameters used in the model building device 103 cannot make the disaggregation model to viably disaggregate the raw testing data. In this situation, the loading disaggregation system 10 resets the structure parameters of the disaggregation model to rebuild the disaggregation model (step S125). Then, the loading disaggregation system 10 enters the training stage STG1 again and uses the reset structure parameters. Subsequently, the loading disaggregation system 10 repeats step S113.

Otherwise, if it is determined that the accuracy reaches the predetermined accuracy threshold in step S123, it reveals that the model evaluation device 105 judges that the comparison result meets the accuracy requirement at the testing stage STG2. Subsequently, the loading disaggregation system 10 terminates the model building mode M1 and enters the model application mode M2.

Then, the loading disaggregation system 10 receives the total raw data from the total electricity meters in connection with the ordinary electricity users 14, and generates synthesized simulation data doutPa, doutPb, doutPc and doutPd corresponding to the electrical appliances A, B, C and D of the ordinary electricity users 14 according to the total raw data (step S131). The synthesized simulation data in this specification represents the simulated characteristic waveform which reveals the power consumption of a specific electrical appliance recorded by the respective electricity meter. Afterward, the loading disaggregation system 10 transmits the synthesized simulation data doutPa, doutPb, doutPc and doutPd corresponding to the electrical appliances A, B, C and D of the ordinary electricity users 14 to the data-gathering and analyzing device 15. Then, the data-gathering and analyzing device 15 gathers and analyzes the synthesized simulation data doutPa, doutPb, doutPc and doutPd corresponding to the electrical appliances A, B, C and D of the ordinary electricity users 14 (step S141).

The principle of acquiring and processing the raw data by the data processing device 101 is substantially the same in any condition, irrespective of the stage and mode of the loading disaggregation system 10 and the composition of the raw data (that is, including the respective raw data rDATa, rDATb, rDATc, and rDATd or not).

Figure 3:
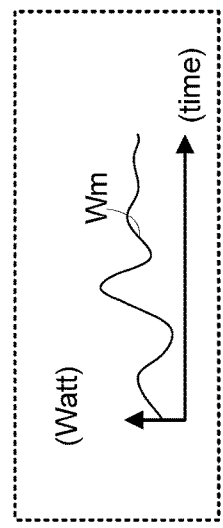
FIG. 3 is a waveform diagram showing raw data outputted from a total electricity meter.

Please refer to FIG. 3 which is a schematic diagram showing the total raw data outputted from one total electricity meter. It is assumed that the measurement period Tdet is one year in the embodiment, but the present invention does not limit this period length. FIG. 3 shows a total meter waveform outputted from one total electricity meter. During the measurement period Tdet, the respective electricity meter corresponding to respective electrical appliances A, B, C and D may output similar waveforms (Wa, Wb, Wc, and Wd). As shown in FIG. 3, the electricity meters continue to output the raw data during the measurement period Tdet. With regard to the original electricity user, the total electricity meters and the respective electricity meters are used to measure and output the raw data. With regard to the ordinary electricity users, only the total electricity meters are used to measure and output the raw data.

Figure 4:
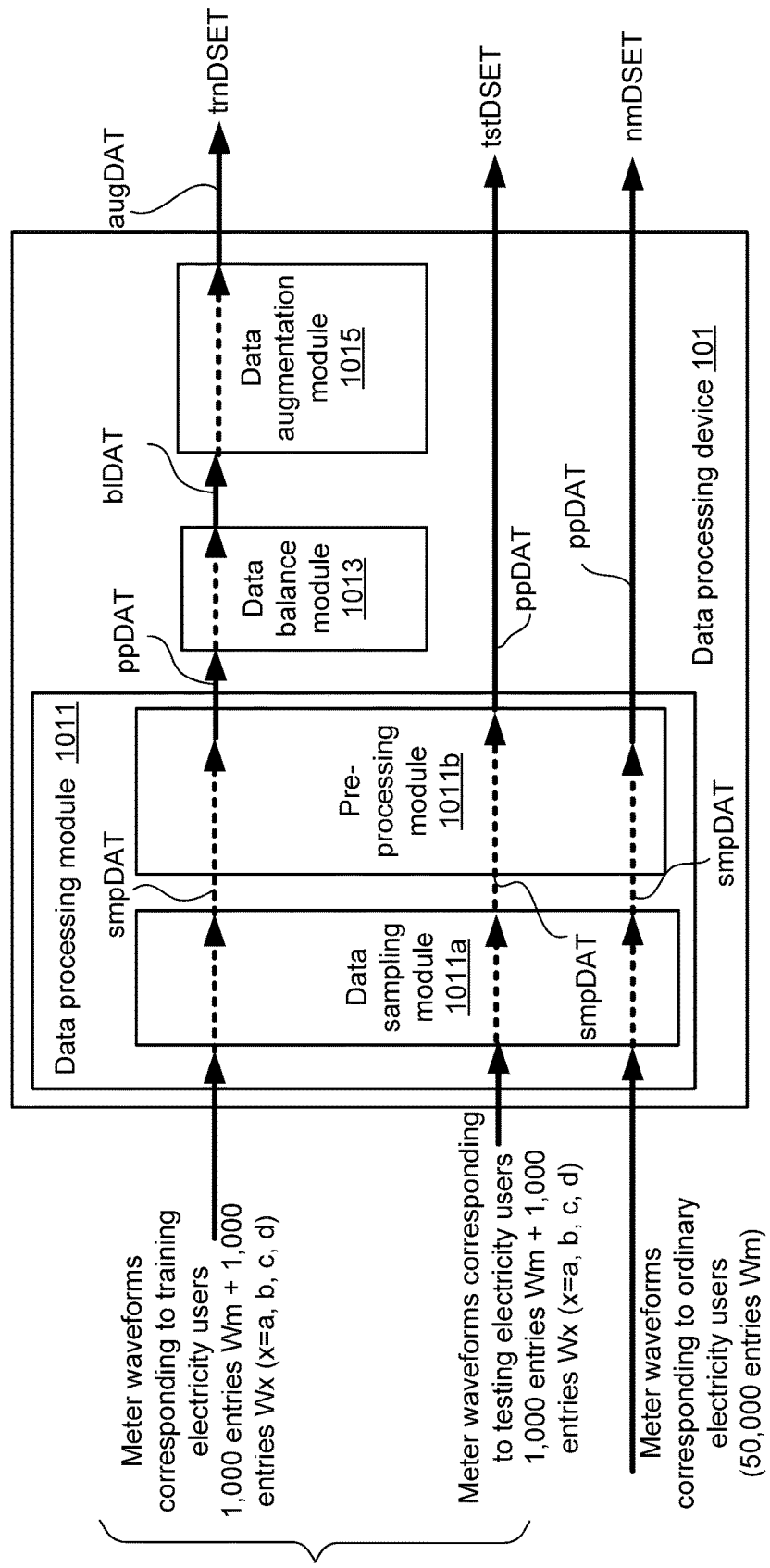
FIG. 4 is a block diagram illustrating how the data processing device processes the raw data at each stage.

Please refer to FIG. 4 which is a block diagram illustrating how the data processing device 101 processes the raw data at each stage. The data processing device 101 includes a data processing module 1011, a data balance module 1013 and a data augmentation module 1015. The data processing module 1011 further includes a data sampling module 1011*a* and a preprocessing module 1011*b*.

As described above, the loading disaggregation system 10 may operate in one of three conditions, the training stage STG1 in the model building mode M1, the testing stage STG2 in the model building mode M1 and the model application mode M2. Three sets of arrows are shown in the drawing to indicate the procedure that the data processing device 101 processes the raw data rDAT.

Firstly, the first set of arrows indicate the training stage STG1 in the model building mode M1. As shown by the arrow direction, after the data processing device 101 receives the recorded data from the training electricity users, the data processing device 101 processes the recorded meter waveforms. The total meter waveforms Wm and the respective appliance meter waveforms Wa, Wb, Wc, and Wd, are processed with the data processing module 1011, the data balance module 1013 and the data augmentation module 1015 to generate augmented data augDAT for the training dataset trnDSET.

Secondly, the second set of arrows indicate the testing stage STG2 in the model building mode M1. After the data processing device 101 receives the total meter waveforms Wm and the respective appliance meter waveforms Wa, Wb, Wc and Wd in connection with the testing electricity users, the waveforms are processed only with the data processing module 1011 to generate preprocessed data ppDAT for the testing dataset tstDSET.

Thirdly, the third set of arrows indicate the model application mode M2. The data processing device 101 only receives the total meter waveforms Wm. The data processing module 1011 processes the total meter waveforms Wm to generate the preprocessed data ppDAT for the ordinary dataset nmDSET.

Compared with the training stage STG1, the data at the testing stage STG2 or in the model application mode M2 will not pass through the data balance module 1013 and the data augmentation module 1015. In other words, the data processing module 1011 is required in all of the three conditions. Therefore, the present disclosure only describes how the data processing device 101 processes the meter waveforms when the loading disaggregation system 10 operates at the training stage STG1, but the principle can be applied to other two conditions.

At first, the data sampling module 1011*a* defines a sampling cycle Tsmp (for example, one minute). The data sampling module 1011*a* samples each meter waveform at intervals of the sampling cycle Tsmp. Each sampling time point is defined as a timestamp. Considering the total meter waveform Wm in connection with one electricity user during one-year measurement period Tdet, 525,600 (60*24*365=525,600) entries of total sampling data smpDATm and 525,600 entries of each respective sampling data smpDATa, smpDATb, smpDATc, and smpDATd can be obtained.

Because the one-year measurement period Tdet is quite long, the one-year measurement period Tdet is further divided into time units (that is, unit processing period Tunit) with fixed time length. In this embodiment, it is assumed that the unit processing period Tunit is one hour. Therefore, there are 8,760 (24*365=8,760) unit processing periods Tunit in one-year measurement period Tdet. Each unit processing period Tunit includes 60 timestamps, and the 60 timestamps correspond to 60 entries of sampling data smpDAT, respectively.

Furthermore, the data processing module 1011 can preprocess the sampling data smpDAT obtained in each unit processing period Tunit, such as normalization and noise filtering, to generate total preprocessed data ppDATm and respective preprocessed data ppDATa, ppDATb, ppDATc, and ppDATd.

Furthermore, in the embodiment, both the total raw data and the respective raw data in connection with one electricity user are obtained in one unit processing period Tunit and collected as one set of data. For one electricity user, if the measurement period Tdet is set as one year and the unit processing period Tunit is set as one hour, the total meter waveform Wm and the respective meter waveforms Wa, Wb, Wc, and Wd correspond to 8,760 (24*365=8,760) sets of raw data rDAT. The data sampling module 1011a samples the 8,760 sets of raw data rDAT to generate 8,760 sets of sampling data smpDAT. Then, the preprocessing module 1011b processes the 8,760 sets of sampling data smpDAT to generate 8,760 sets of preprocessed data ppDAT.

The data sampling module 1011a and the preprocessing module 1011b samples and preprocesses the raw data rDAT in units of the unit processing period Tunit. Accordingly, the number of the data entries inputted into the data sampling module 1011a and the preprocessing module 1011b equals the number of the data entries outputted from the data sampling module 1011a and the preprocessing module 1011b.

For illustration purposes, 1,000 training original users are assigned for the training stage STG1 in the model building mode M1, 1,000 testing original users are assigned for the testing stage STG2 in the model building mode M1, and 50,000 ordinary users are assigned for model application mode M2 in the embodiment. In addition, as defined above, the measurement period Tdet is set as one year, the unit processing period Tunit is set as one hour and the sampling cycle Tsmp is set as one minute. According to the setting, the contents of the training dataset trnDSET, the testing dataset tstDSET and the ordinary dataset nmDSET are described below.

At the training stage STG1, the preprocessing module 1011b outputs 8,760,000 sets (8,760*1000=8,760,000) of preprocessed data ppDAT (including data related to the total electricity meters and the respective electricity meters corresponding to the electrical appliances A, B, C, and D). These preprocessed data ppDAT are processed through the data balance module 1013 and the data augmentation module 1015 before being provided for the training dataset trnDSET.

At the testing stage STG2, the preprocessing module 1011b outputs 8,760,000 sets (8,760*1000=8,760,000) of preprocessed data ppDAT (including data related to the total electricity meters and the respective electricity meters corresponding to the electrical appliances A, B, C, and D). These preprocessed data ppDAT are provided for the testing dataset tstDSET. In the model application mode M2, the preprocessing module 1011b outputs 438,000,000 sets (8,760*50,000=438,000,000) of preprocessed data ppDAT (only including data related to the total electricity meters). These preprocessed data ppDATm are provided for the ordinary dataset nmDSET.

At the training stage STG1, the preprocessed data ppDAT should be further processed by the data balance module 1013 and the data augmentation module 1015. After referring to the usage behavior of the electrical appliances A, B, C and D during the unit processing period Tunit, the data balance module 1013 performs bootstrapping on the total preprocessed data ppDATm, the respective preprocessed data ppDATa, ppDATb, ppDATc and ppDATd to generate total balanced data blDATm and respective balanced data blDATa, blDATb, blDATc and blDATd. The data augmentation module 1015 augments the total balanced data blDATm and the respective balanced data blDATa, blDATb, blDATc and blDATd according to at least one data augmentation rule to generate total augmented data augDATm and respective augmented data augDATa, augDATb, augDATc, and augDATd. Afterwards, the total augmented data augDATm, and the respective augmented data augDATa, augDATb, augDATc and augDATd generated by the data augmentation module 1015 are provided for the training dataset trnDSET.

In brief, the data balance module 1013 and the data augmentation module 1015 can provide greater diversity of data for the model building device 103 at the training stage STG1 so that the disaggregation model can provide generalization effect. Therefore, the number of entries of the total balanced data blDATm is greater than the number of entries of the total preprocessed data ppDATm, and the number of entries of the total augmented data augDATm is greater than the number of entries of the total balanced data blDATm.

The data balance module 1013 balances the data and the data augmentation module 1015 augments the data in units of the unit processing period Tunit. Therefore, after the balance procedure, the number of entries of the total balanced data blDATm is equal to the number of entries of the respective balanced data blDATa, blDATb, blDATc or blDATd. After the augmentation procedure, the number of entries of the total augmented data augDATm is equal to the number of entries of the respective augmented data augDATa, augDATb, augDATc or augDATd.

The description of how the data balance module 1013 and the data augmentation module 1015 increase the data entries in the training dataset trnDSET is given below. In practice, the data balance module 1013 and the data augmentation module 1015 can increase the data entries in the training dataset trnDSET through other know schemes and the preset invention does not limit the schemes to the embodiments given in the specification.

In the embodiment, the data balance module 1013 may determine the work time of respective electrical appliances A, B, C and D in one day according to the predefined conditions. Then, the data balance module 1013 raises the ratio of the data related to the electrical appliance(s) with shorter work time in the training dataset trnDSET.

Because of various factors, the work times and usage behavior of the same kind of electrical appliance may be different for different electricity users, and the work times and usage behavior of one electrical appliance for same electricity user may be different in different seasons. Hence, the present invention further determines the work times of respective electrical appliances and raises the data amount of the less-used electrical appliance. For example, a power threshold Pth and a time threshold are defined for each electrical appliance A, B, C or D to be compared with the measuring result of the respective electrical appliances A, B, C and D. If the measuring result reaches the power threshold Pth and the time threshold for a specific electrical appliance A, B, C or D, it indicates that the specific electrical appliance A, B, C or D is actually used in the unit processing period Tunit, and the work time of the specific electrical appliance A, B, C or D is obtained. The probability (ratio) of the data related to the less-used electricity appliance in the training dataset trnDSET is purposely raised. Because of the newly added data, the number of entries of the balanced data blDAT generated by the data balance module 1013 is greater than the number of entries of the preprocessed data ppDAT.

In the embodiment, the data augmentation module 1015 augments the total balanced data blDATm and the respective balanced data blDATa, blDATb, blDATc and blDATd according to at least one data augmentation method. For example, the data augmentation module 1015 may adopt the data augmentation methods such as truncation, adding noise, signal synthesis and shifting to augment the balanced data blDAT. It is to be noted that the data augmentation is not limited to these methods.

The data augmentation method is applied to all of the balanced data blDAT so that the number of entries of the augmented data increases proportionally. For example, there are X sets of balanced data blDAT and five data augmentation methods are used. Thus, additional 5X sets of data are obtained from the five data augmentation methods. Therefore, the data augmentation module 1015 outputs 6X sets of augmented data augDAT.

In practice, the data augmentation module 1015 can significantly increase the quantity of the augmented data augDAT in the training dataset trnDSET. Furthermore, one data augmentation method can provide several augmented data by parameters. For example, the parameters may include truncation time, noise amplitude, time for adding noise, methods of signal synthesis and shifting ratio.

As described above, the data outputted by the data processing device 101 in one unit processing period Tunit are collected as one set of data. Among each set of data outputted by the data processing device 101, the data related to the total electricity meters will be sent to the model building device 103 and defined as total aggregated data ainPm, whereas the data related to the electrical appliances A, B, C and D will be sent to the model evaluation device 105 and defined as respective verification data dvrPa, dvrPb, dvrPc and dvrPd.

As described above, in the embodiment, the loading disaggregation system 10 performs different operation in different modes. In the model building mode M1, the model building device 103 of the loading disaggregation system 10 updates the parameters repetitively. After the model evaluation device 105 confirms that the accuracy of the disaggregation model reaches the predetermined accuracy threshold at the testing stage STG2, the loading disaggregation system 10 enters the model application mode M2 and only uses the disaggregation model afterwards.

Figure 5:
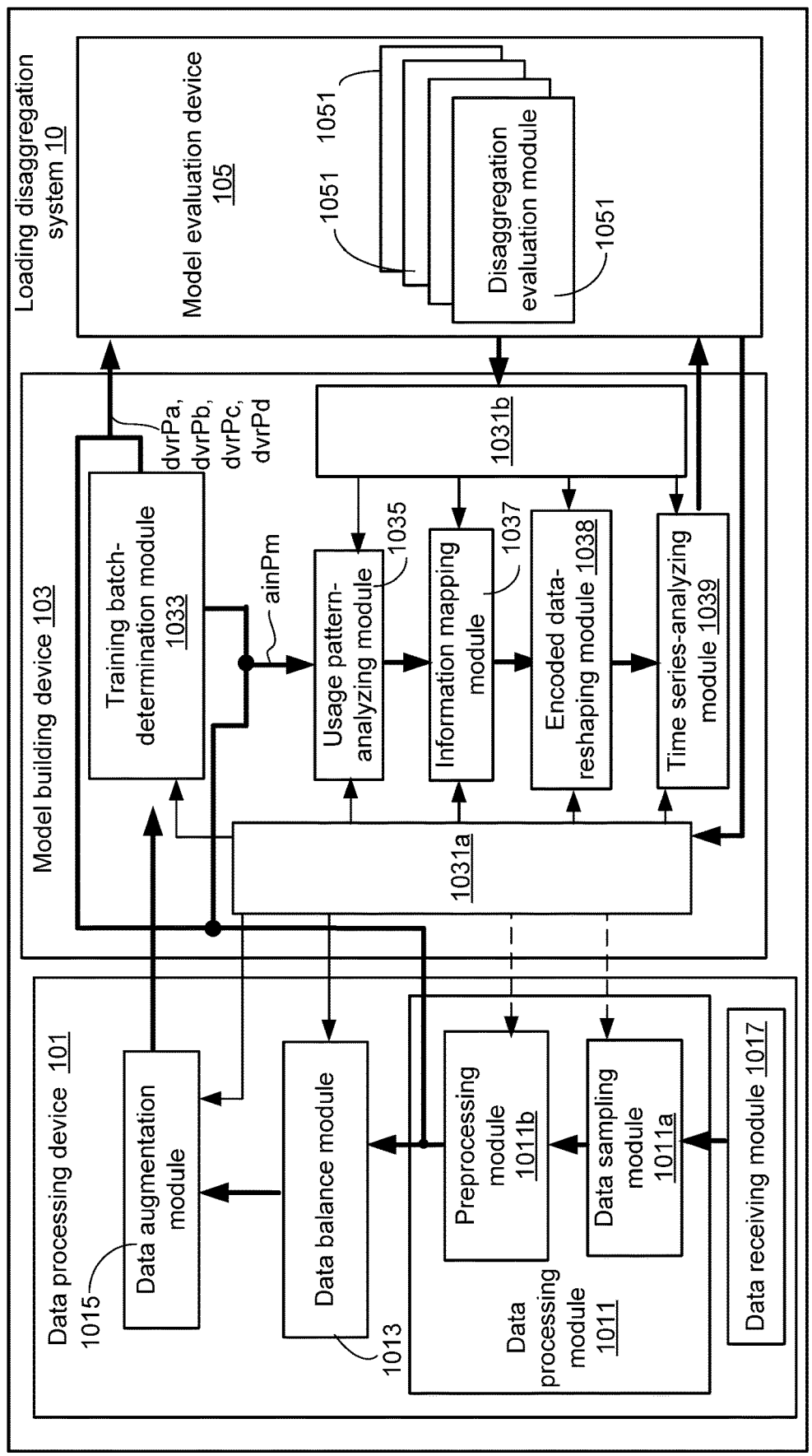
FIG. 5 is a block diagram illustrating the architecture of the loading disaggregation system.

Please refer to FIG. 5, a block diagram illustrating an architecture of the loading disaggregation system. In this diagram, thick arrows show the data flow, and thin arrows show the control signal path.

The internal elements of the data processing device 101 and their connection are described first. The data processing device 101 includes the data processing module 1011, the data balance module 1013, the data augmentation module 1015 and the data receiving module 1017. The data receiving module 1017 is in communication with the network 11 and receives the raw data rDAT corresponding to the electricity users through the network 11. In the data processing device 101, the data receiving module 1017 is electrically connected to the data sampling module 1011a. The preprocessing module 1011b is electrically connected to the data sampling module 1011a, the data balance module 1013, the model building device 103 and the model evaluation device 105. The data augmentation module 1015 is electrically connected to the data balance module 1013, the model building device 103 and the model evaluation device 105.

Then, the internal elements of the model building device 103 and their connection are described. The model building device 103 includes a training batch-determination module 1033, a usage pattern-analyzing module 1035, an information mapping module 1037, an encoded data-reshaping module 1038, a time series-analyzing module 1039, a structure parameter-updating module 1031a and an auxiliary parameter-updating module 1031b.

The training batch-determination module 1033 is electrically connected to the data augmentation module 1015, the usage pattern-analyzing module 1035 and the model evaluation device 105. The training batch-determination module 1033 divides the sets of augmented data augDAT into batches wherein each set of augmented data augDAT includes the total augmented data augDATm and the respective augmented data augDATa, augDATb, augDATc, and augDATd. The way of dividing the augmented data augDAT into batches does not change the number of sets of the augmented data augDAT.

The usage pattern-analyzing module 1035 is electrically connected to the training batch-determination module 1033 and the preprocessing module 1011b. The information mapping module 1037 is electrically connected to the usage pattern-analyzing module 1035 and the encoded data-reshaping module 1038. The time series-analyzing module 1039 is electrically connected to the encoded data-reshaping module 1038 and the model evaluation device 105. The details about processing the data with the usage pattern-analyzing module 1035, the information mapping module 1037 and the time series-analyzing module 1039 will be further described with reference to FIGS. 9~14.

In brief, the usage pattern-analyzing module 1035 receives the total aggregated data ainPm, analyzes the total aggregated data ainPm based on the detection conditions, and generates usage pattern information (for example, time-frequency usage pattern information or edge usage pattern information). The information mapping module 1037 maps the usage pattern information to form encoded data having multiple mapping dimensions correspondingly. The time series-analyzing module 1039 analyzes the correlation of the encoded data corresponding to each timestamp to generate synthesized simulation data doutPa, doutPb, doutPc and doutPd with a time length of the unit processing period Tunit. Each of the usage pattern-analyzing module 1035, the information mapping module 1037 and the time series-analyzing module 1039 operates in the same way through every mode and every stage of the loading disaggregation system 10.

As described above, the internal control parameters in the loading disaggregation system 10 include the structure parameters and the auxiliary parameters. The structure parameters include, for example, sampling cycle Tsmp (for example, one minute), unit processing period Tunit (for example, one hour), time-frequency range of the time-frequency detector (receptive field size of convolutional neural network (CNN) which is related to the work time of the electrical appliance), power threshold Pth, time threshold, measurement period Tdet, number of electricity users, and batch size for training the disaggregation model. The auxiliary parameters include, for example, weight used in the usage pattern-analyzing module 1035, the information mapping module 1037, the encoded data-reshaping module 1038 and the time series-analyzing module 1039. The structure parameter-updating module 1031a is configured to set the structure parameters, and the auxiliary parameter-updating module 1031b is configured to update the auxiliary parameters. In the loading disaggregation system 10, the auxiliary parameters are repetitively updated at the training stage STG1, while the structure parameters are adjusted only when it is determined that the accuracy of the disaggregation model does not reach the predetermined accuracy threshold at the testing stage STG2. Therefore, the frequency for updating the structure parameters is lower than that of the auxiliary parameters.

At the training stage STG1, the auxiliary parameter-updating module 1031b receives a verification result (that is, comparison result indicating the similarity between the synthesized simulation data doutPa, doutPb, doutPc and doutPd and the respective verification data dvrPa, dvrPb, dvrPc, and dvrPd) from the model evaluation device 105. Furthermore, the auxiliary parameter-updating module 1031b sends control signals to the usage pattern-analyzing module 1035, the information mapping module 1037, the encoded data-reshaping module 1038 and the time series-analyzing module 1039 to update the auxiliary parameters according to the verification result. In addition, the structure parameter-updating module 1031a also adjusts the learning rate of the structure parameters at the training stage STG1.

At the testing stage STG2, the structure parameter-updating module 1031a receives the verification result from the model evaluation device 105. If the verification result does not reach the predetermined accuracy threshold, it reveals that the similarity between the synthesized simulation data doutPa, doutPb, doutPc and doutPd and the respective verification data dvrPa, dvrPb, dvrPc, and dvrPd is not satisfied. Therefore, the model building device 103 should adjust the structure parameters and rebuild/retrain the disaggregation model. In this condition, the structure parameter-updating module 1031a adjusts the structure parameters of the data sampling module 1011a, the preprocessing module 1011b, the data balance module 1013, the data augmentation module 1015, the training batch-determination module 1033, the usage pattern-analyzing module 1035, the information mapping module 1037, the encoded data-reshaping module 1038 and the time series-analyzing module 1039. On the contrary, if the verification result reaches the predetermined accuracy threshold, it reveals that the similarity between the synthesized simulation data doutPa, doutPb, doutPc and doutPd and the respective verification data dvrPa, dvrPb, dvrPc, and dvrPd is satisfied. Thus, the model building device 103 completes parameter setting of the disaggregation model.

The model evaluation device 105 includes disaggregation evaluation modules 1051 electrically connected between the time series-analyzing module 1039 and the data processing device 101. The disaggregation evaluation module 1051 corresponding to the electrical appliance A receives the synthesized simulation data doutPa and the respective verification data dvrPa from the time series-analyzing module 1039 and the data processing device 101, respectively, and compares both to obtain the similarity between them. Afterwards, the comparison result about the similarity is sent to the auxiliary parameter-updating module 1031b. The operation of other disaggregation evaluation modules 1051 corresponding to the electrical appliances B, C and D can be derived from the above description, and the repetitious details are not given herein.

When the loading disaggregation system 10 is at the training stage STG1, the disaggregation evaluation modules 1051 receive the respective augmented data augDATa, augDATb, augDATc and augDATd from the training batch-determination module 1033, and receive the synthesized simulation data doutPa, doutPb, doutPc and doutPd from the time series-analyzing module 1039. Afterwards, the disaggregation evaluation modules 1051 compare the respective augmented data augDATa, augDATb, augDATc and augDATd received from the training batch-determination module 1033 with the synthesized simulation data doutPa, doutPb, doutPc and doutPd received from the time series-analyzing module 1039 to calculate the loss functions.

When the loading disaggregation system 10 is at the testing stage STG2, the disaggregation evaluation modules 1051 receive the respective preprocessed data ppDATa, ppDATb, ppDATc and ppDATd from the preprocessing module 1011b, and receive the synthesized simulation data doutPa, doutPb, doutPc and doutPd from the time series-analyzing module 1039. Afterwards, the disaggregation evaluation modules 1051 compare the respective preprocessed data ppDATa, ppDATb, ppDATc and ppDATd received from the preprocessing module 1011b with the synthesized simulation data doutPa, doutPb, doutPc and doutPd received from the time series-analyzing module 1039 to calculate the accuracy. The disaggregation evaluation modules 1051 may uses any known criterion to judge the similarity to meet different requirements and application conditions.

Figure 6:
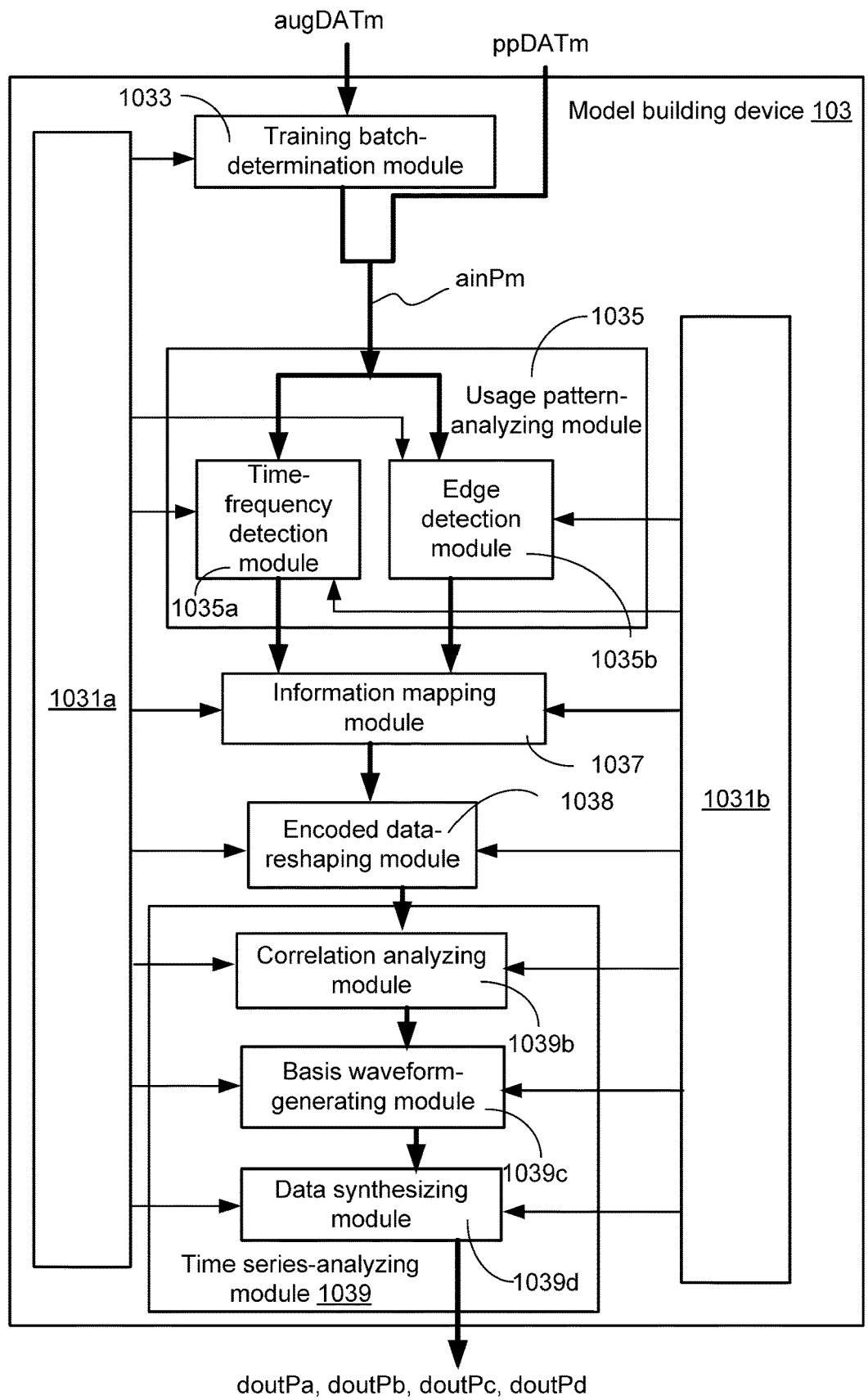
FIG. 6 is a block diagram illustrating the architecture of the model building device.

Please refer to FIG. 6, a block diagram illustrating an architecture of the model building device. In this diagram, the usage pattern-analyzing module 1035 further includes a time-frequency detection module 1035a and an edge detection module 1035b; and the time series-analyzing module 1039 further includes a correlation analyzing module 1039b, a basis waveform-generating module 1039c and a data synthesizing module 1039d. The time-frequency detection module 1035a and the edge detection module 1035b are electrically connected to the training batch-determination module 1033, the information mapping module 1037, the structure parameter-updating module 1031a and the auxiliary parameter-updating module 1031b. The correlation analyzing module 1039b is electrically connected to the structure parameter-updating module 1031a, the auxiliary parameter-updating module 1031b, the encoded data-reshaping module 1038 and the basis waveform-generating module 1039c. The basis waveform-generating module 1039c and the data synthesizing module 1039d are electrically connected to each other, and both are electrically connected to the structure parameter-updating module 1031a and the auxiliary parameter-updating module 1031b.

Figure 7:
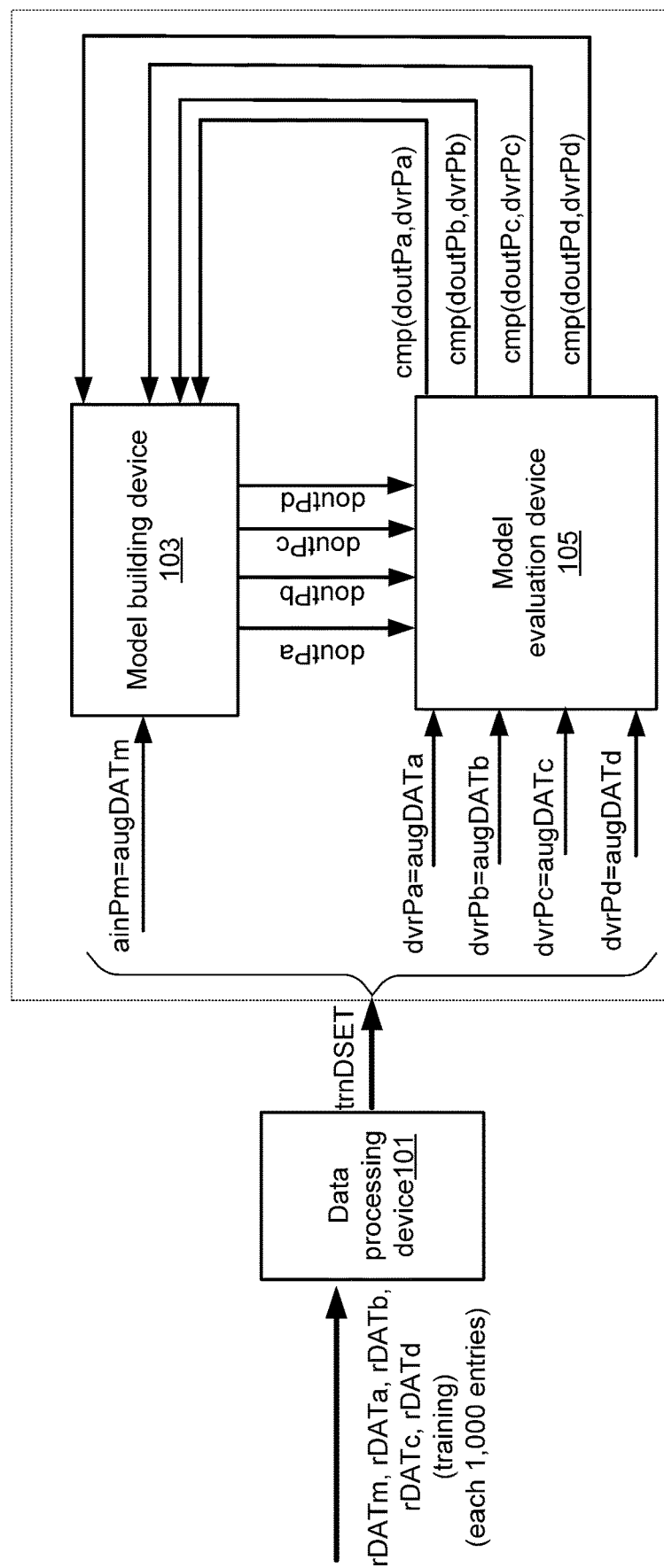
FIG. 7 shows data flow in the loading disaggregation system at the training stage.

Please refer to FIG. 7, which shows data flow in the loading disaggregation system at the training stage. In this diagram, the block with dotted lines shows the data flow of the augmented data in the training dataset trnDSET wherein one set of the augmented data includes the total augmented data augDATm and the respective augmented data augDATa, augDATb, augDATc, and augDATd. At the training stage STG1, the data processing device 101 generates the training dataset trnDSET according to the raw training data (including the total raw data rDATm and the respective raw data rDATa, rDATb, rDATc, and rDATd). Afterwards, the augmented data augDAT in the training dataset trnDSET are transmitted to the model building device 103 and the model evaluation device 105 in turn. The total augmented data augDATm and the respective augmented data augDATa, augDATb, augDATc and augDATd in one set of augmented data augDAT are obtained in one unit processing period Tunit. The loading disaggregation system 10 transmits the total augmented data augDATm as the total aggregated data ainPm to the model building device 103, and transmits the respective augmented data augDATa, augDATb, augDATc, and augDATd as the respective verification data dvrPa, dvrPb, dvrPc and dvrPd to the model evaluation device 105.

The model building device 103 receives the total aggregated data ainPm and generates the synthesized simulation data doutPa, doutPb, doutPc, and doutPd according to the total aggregated data ainPm. Then, the synthesized simulation data doutPa, doutPb, doutPc, and doutPd are transmitted to the model evaluation device 105. The model evaluation device 105 compares the synthesized simulation data doutPa, doutPb, doutPc, and doutPd with the respective verification data dvrPa, dvrPb, dvrPc and dvrPd in a one-to-one manner (that is, doutPa vs. dvrPa, doutPb vs. dvrPb, doutPc vs. dvrPc and doutPd vs. dvrPd). Then the comparison results about the similarity cmp(doutPa, dvrPa), cmp (doutPb, dvrPb), cmp(doutPc, dvrPc) and cmp(doutPd, dvrPd) are transmitted to the model building device 103 for adjusting the parameters.

Figure 8:
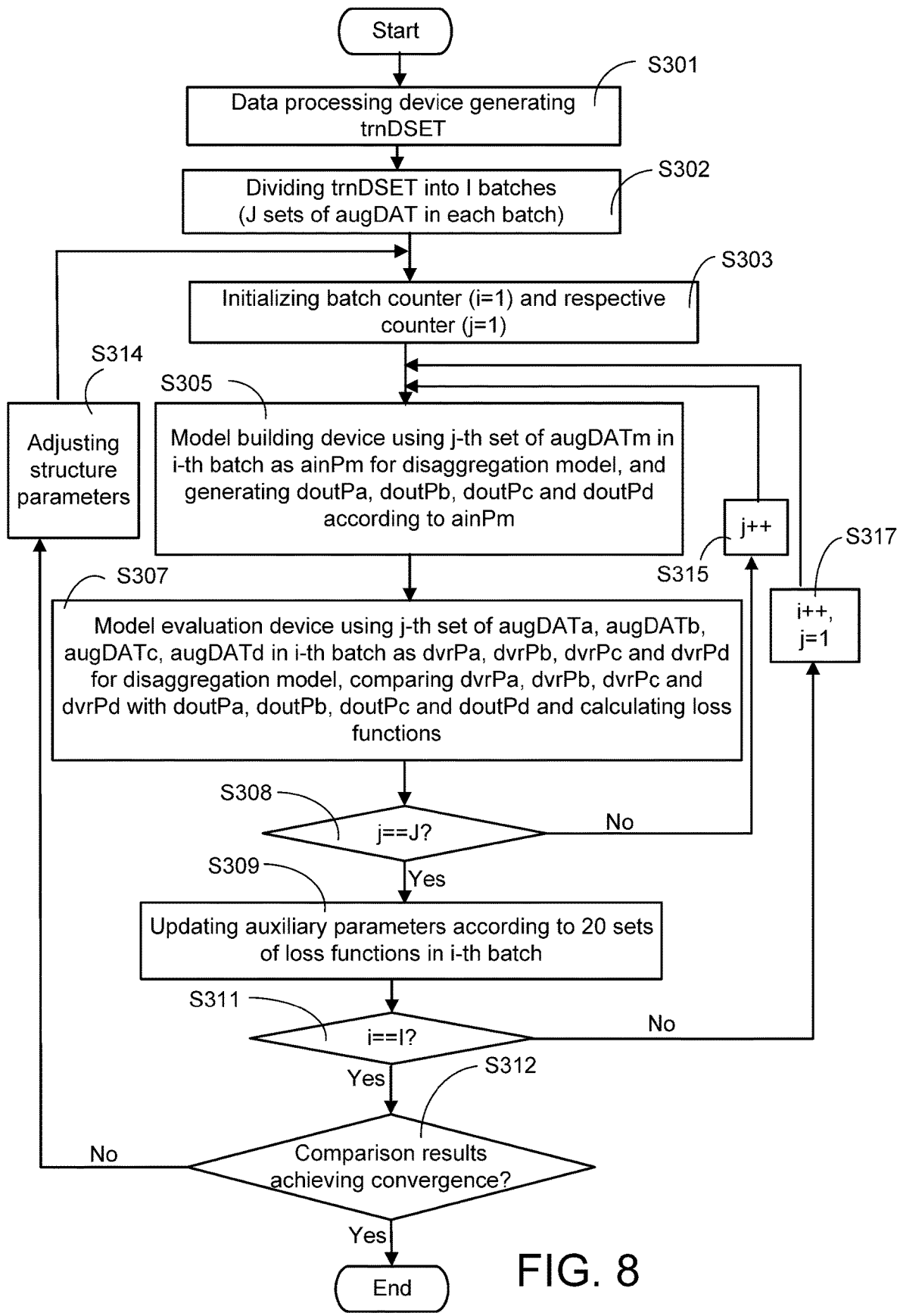
FIG. 8 is a flowchart illustrating the training stage of the loading disaggregation system.

Please refer to FIG. 8, a flowchart illustrates the training stage of the loading disaggregation system. At first, the data processing device 101 generates the training dataset trnDSET (step S301). The details of step S301 may refer to the first set of arrows in FIG. 4 and are not repeated herein. Then, the training batch-determination module 1033 divides the augmented data augDAT in the training dataset trnDSET into I batches wherein each batch includes J sets of augmented data augDAT (step S302). The batch counter (i=1) and the respective counter (j=1) are initialized (step S303). Subsequently, the model building device 103 uses the j-th total augmented data augDATm in the i-th batch in the training dataset trnDSET as the total aggregated data ainPm to be transmitted to the disaggregation model. Afterwards, the disaggregation model generates the synthesized simulation data doutPa, doutPb, doutPc, and doutPd according to the total aggregated data ainPm (step S305).

After the model building device 103 generates the synthesized simulation data doutPa, doutPb, doutPc and doutPd according to the total aggregated data ainPm, the model evaluation device 105 takes the j-th set of the respective augmented data augDATa, augDATb, augDATc and augDATd in the i-th batch in the training dataset trnDSET as the respective verification data dvrPa, dvrPb, dvrPc and dvrPd, which are then compared with the synthesized simulation data doutPa, doutPb, doutPc and doutPd generated according to the total aggregated data ainPm, to calculate the loss functions (step S307). Subsequently, it is determined whether the value of j is equal to the value of J (step S308). In other words, the loading disaggregation system 10 determines whether all of the respective verification data dvrPa, dvrPb, dvrPc and dvrPd in the current batch have been completely compared with the synthesized simulation data doutPa, doutPb, doutPc, and doutPd. If the decision in step S308 is "no," the respective counter (j counter) is incremented by one (step S315) and goes back to step S305.

If the decision in step S308 is "yes," it represents that all of the J sets of data in the current batch have been used for the verification. At this time, the auxiliary parameter-updating module 1031b updates the auxiliary parameters according to twenty sets of calculated loss functions in the i-th batch (step S309). Afterwards, it is determined whether the value of i is equal to the value of I (step S311). In other words, the loading disaggregation system 10 determines whether all of the respective verification data dvrPa, dvrPb, dvrPc and dvrPd in all batches have been completely compared with the synthesized simulation data doutPa, doutPb, doutPc, and doutPd.

If the decision in step S311 is "no," the batch counter (i counter) is incremented by one and the respective counter (j counter) is initialized (step S317). Then, the operation goes back to step S305. If the decision in step S311 is "yes," the loading disaggregation system 10 determines whether the comparison results achieve convergence (step S312). If the operation goes from step S303 to step S312 successfully, it represents that all the augmented data in the training dataset trnDSET have been inputted to the disaggregation model.

If the decision in step S312 is "yes," the operation ends. If the decision in step S312 is "no," the structure parameter-updating module 1031a will execute step S303 again after adjusting the structure parameters (for example, learning rate) (step S314). With the progress of training the disaggregation model, the disaggregation effect becomes better and better. The present invention gradually decreases the learning rate according to the Iteration number to decrease the change in the parameters. Besides, the data processing device 101 need not repetitively generate the training dataset trnDSET. Only the model building device 103 needs repetitively execute the training stage STG1, and the model evaluation device 105 needs repetitively evaluate the disaggregation model.

Figure 9:
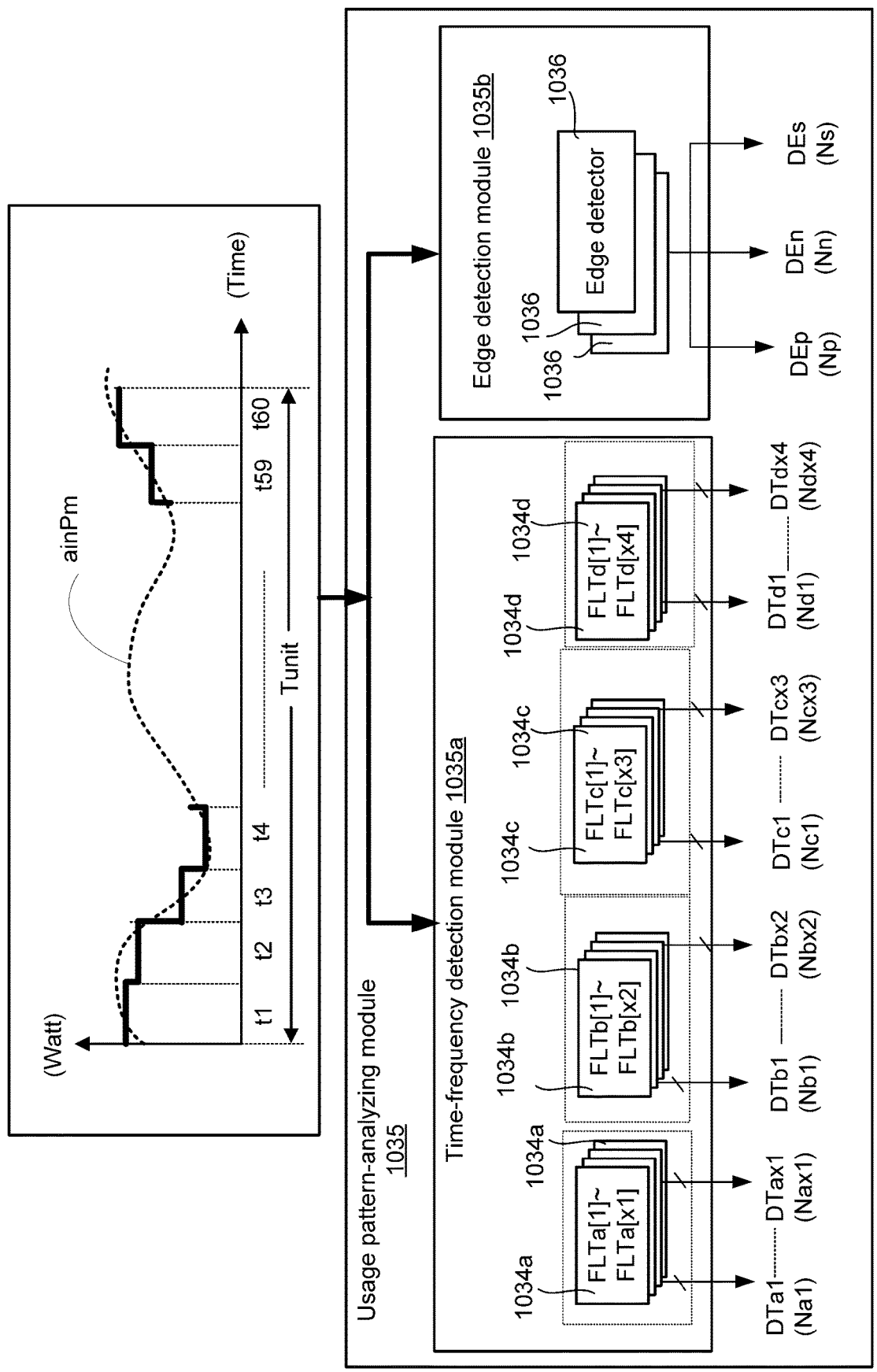
FIG. 9 is a schematic diagram illustrating the architecture of a usage pattern-analyzing module.
Figure 12:
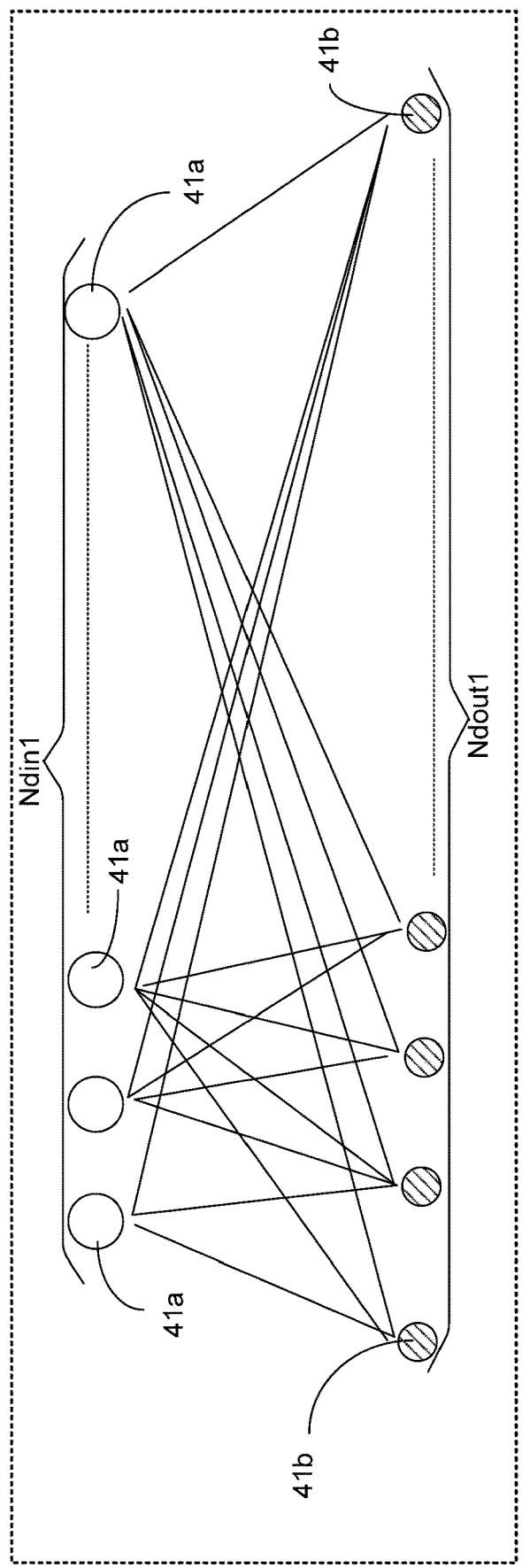
FIG. 12 is a schematic diagram showing how an information mapping module encodes data.
Figure 13:
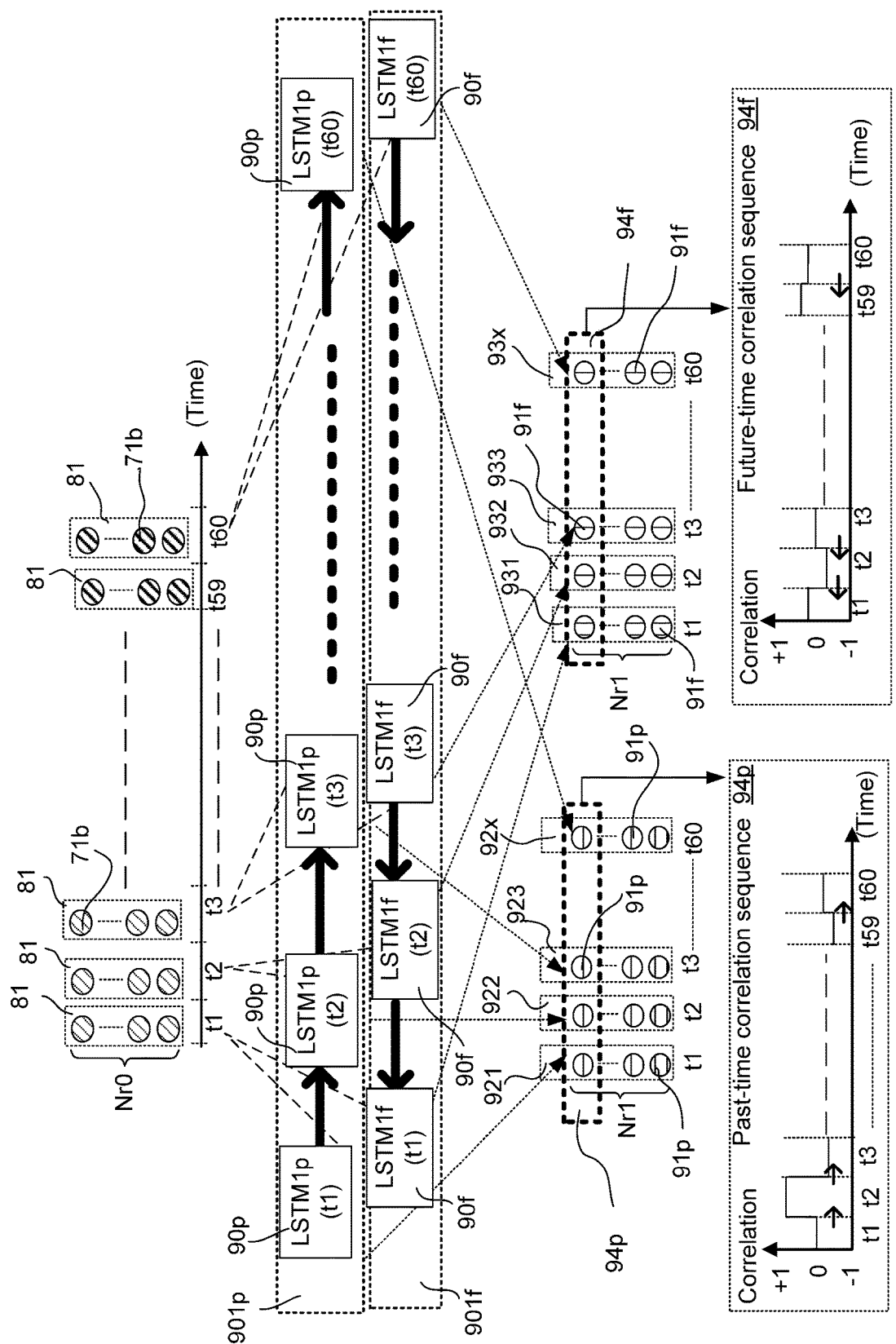
FIG. 13 is a schematic diagram showing how a correlation analyzing module converts timestamp encoded data groups corresponding to the timestamps into the past-time correlation sequences and the future-time correlation sequences.
Figure 14:
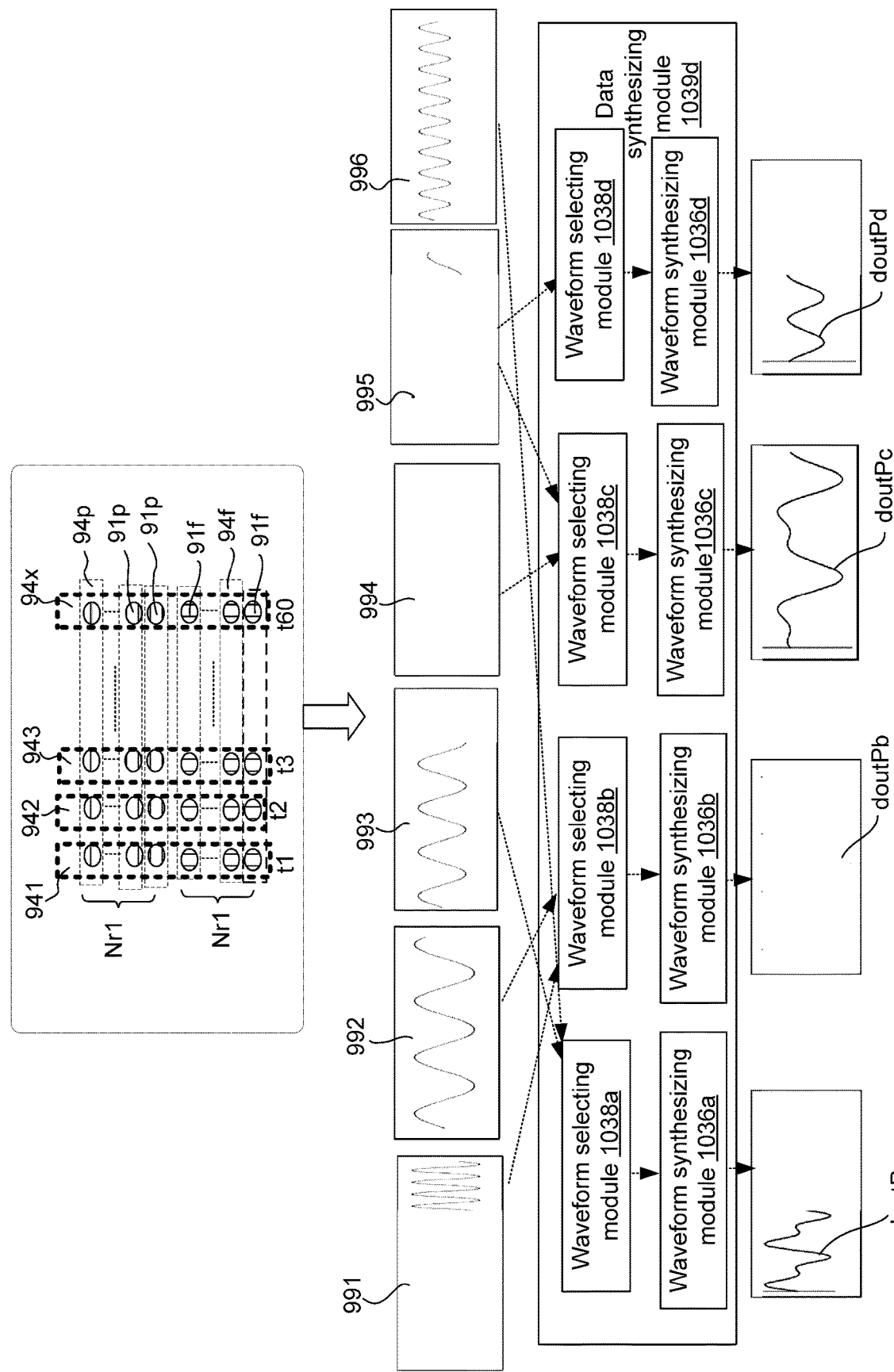
FIG. 14 is a schematic diagram showing how a basis waveform-generating module converts the past-time correlation sequences and the future-time correlation sequences into past-time waveforms and future-time waveforms, and how a data synthesizing module performs waveform selection and waveform reconfiguration to the basis waveforms to generate synthesized simulation data of respective electrical appliances.

FIGS. 9~14 further illustrate the architecture of the model building device 103 and the principle of disaggregating the total aggregated data ainPm. In particular, FIGS. 9~11 illustrate that the usage pattern-analyzing module 1035 detects the waveform feature (for example, time-frequency distribution for appliances usage duration, edge change for appliances switch mode) of the total aggregated data ainPm based on the detection conditions, and generates usage pattern information according to the detection result. FIG. 12 illustrates that the information mapping module 1037 maps the usage pattern information to encoded data with multiple mapping dimensions. FIGS. 13 and 14 illustrate that the time series-analyzing module 1039 analyzes each timestamp for encoded data group generated by the encoded data-reshaping module 1038 and finds out the time correlation to generate the synthesized simulation data doutPa, doutPb, doutPc and doutPd corresponding to each timestamp.

Please refer to FIG. 9, a schematic diagram illustrating an architecture of the usage pattern-analyzing module. The usage pattern-analyzing module 1035 receives the total aggregated data ainPm corresponding to one unit processing period Tunit.

The usage pattern-analyzing module 1035 includes a time-frequency detection module 1035a and an edge detection module 1035b, both adopting CNN architecture. Although the time-frequency detection module 1035a and the edge detection module 1035b receive the same total aggregated data ainPm, they focus on different patterns of the total aggregated data ainPm. The time-frequency detection module 1035a uses the time-frequency information to analyze the total aggregated data ainPm to evaluate the temporal profiles of usage of the electrical appliances A, B, C and D. Furthermore, while powering on or powering off one or more electrical appliances A, B, C, and D, positive edge triggering or negative edge triggering occurs on the total aggregated data ainPm. Accordingly, the edge detection module 1035b detects the positive edge triggering and the negative edge triggering from the total aggregated data ainPm.

The time-frequency detection module 1035a includes time-frequency detectors 1034a, time-frequency detectors 1034b, time-frequency detectors 1034c and time-frequency detectors 1034d corresponding to the electrical appliances A, B, C, and D, respectively.

The quantities of the time-frequency detectors 1034a, 1034b, 1034c and 1034d corresponding to individual electrical appliances A, B, C, and D may be or may be not equal to each other. For example, there are x1 time-frequency detectors 1034a (FLTa[1]~FLTa[x1]) corresponding to the electrical appliance A; there are x2 time-frequency detectors 1034b (FLTb[1]~FLTb[x2]) corresponding to the electrical appliance B; there are x3 time-frequency detectors 1034c (FLTc[1]~FLTc[x3]) corresponding to the electrical appliance C; and there are x4 time-frequency detectors 1034d (FLTd[1]~FLTd[x4]) corresponding to the electrical appliance D.

The detection results of the time-frequency detectors 1034a, 1034b, 1034c and 1034d may be affected by the receptive field size of CNN, the time threshold and the power threshold Pth defined for the work time of respective electrical appliances, the total meter waveforms Wm and the respective meter waveforms Wa, Wb, Wc, and Wd. Even the time-frequency detectors 1034a corresponding to the same electrical appliance A may use different time-frequency filter parameters.

The time-frequency detectors corresponding to the same electrical appliance do not generate exactly the same detection results after analyzing the same total aggregated data ainPm because of different time-frequency filter parameters. For example, the time-frequency detector FLTa[1] analyzes the total aggregated data ainPm and generates Na1 entries of time-frequency usage pattern information Dta1 corresponding to the electrical appliance A, and the time-frequency detector FLTa[x1] analyzes the total aggregated data ainPm and generates Nax1 entries of time-frequency usage pattern information Dtax1 corresponding to the electrical appliance A, wherein Na1 may be equal to or different from Nax1. Accordingly, the time-frequency detectors FLTa[1]~FLTa[x1] corresponding to the electrical appliance A will generate (Na1+Na2+Na3 . . . Nax1) entries of time-frequency usage pattern information DTa1~DTax1 corresponding to the electrical appliance A. Similarly, the time-frequency detectors corresponding to the electrical appliances B, C and D analyze the total aggregated data ainPm and generate different entries (Nb1~Nbx2, Nc1~Ncx3, Nd1~Ndx4) of time-frequency usage pattern information (DTb1~DTbx2, DTc1~DTcx3, DTd1~DTdx4).

The time-frequency detectors 1034a, 1034b, 1034c and 1034d can set the corresponding time-frequency parameters, but the quantity and values of the time-frequency parameters are not limited. For example, the parameters for time-frequency filter may include the size of receptive field Tscan, length of time domain parameter Tflt for usage duration of at least one electrical appliance, and power threshold Pth of at least one electrical appliance. The time-frequency detectors 1034a, 1034b, 1034c and 1034d can detect over the total aggregated data ainPm for all timestamps or fewer timestamps by setting the stride parameter.

Please refer to FIG. 10, a schematic diagram showing the time-frequency parameters used by time-frequency detector. In this diagram, the time-frequency filter parameters include the receptive field Tscan and the time domain parameter Tflt. It is assumed that the receptive field Tscan is equal to the work time Tflt (Tscan=Tflt).

Please refer to FIG. 11, a schematic diagram showing the edge detector. The edge detection module 1035b includes edge detectors 1036 which may be set with different edge detection conditions to analyze the total aggregated data ainPm. For illustration purposes only, only one edge detector 1036 is shown.

The edge detector 1036 centers each timestamp t1~t60 with the predetermined receptive field Tscan to analyze the total aggregated data ainPm. The edge detector 1036 performs detection for the timestamps t1~t60 in turn, and generates the edge usage pattern information. In this diagram, the length of the receptive field Tscan of the edge detector 1036 is three. For example, when the edge detector 1036 centers the timestamp t2, the adjacent timestamps t1 and t3 are covered by the edge detector 1036. The edge detectors 1036 may have different detection conditions to detect the edge usage pattern information of the total aggregated data ainPm, including positive edge triggering DEp, negative edge triggering DEn and steady state DEs. After the edge detector 1036 performs the detection for the timestamps t1~t60 to analyze the total aggregated data ainPm, it is realized that Np timestamps, Nn timestamps, and Ns timestamps are positive edge triggered, negative edge triggered and steady, respectively.

Since each edge detector 1036 performs detection for sixty timestamps in one unit processing period Tunit, each edge detector 1036 generates sixty entries of edge usage pattern information (Np+Nn+Ns=60). The edge detectors 1036 have different detection conditions wherein the receptive field Tscan is adjustable. Therefore, when different edge detectors 1036 perform detection for the same timestamp of the total aggregated data ainPm, the detection results are not exactly the same.

In the usage pattern-analyzing module 1035, the quantity of the time-frequency detectors in one time-frequency detection module 1035a and the quantity of the edge detectors 1036 in one edge detection module 1035b are structure parameters, and are fixed during the training stage STG1. On the other hand, the detection conditions of the time-frequency detectors and the edge detectors are auxiliary parameters, and can be updated by the auxiliary parameter-updating module 1031b during the training stage STG1.

As described above, the time-frequency detection module 1035a generates (Na1+Na2+Na3 . . . Nax1) entries of time-frequency usage pattern information corresponding to the electrical appliance A, (Nb1+Nb2+Nb3 . . . Nbx2) entries of time-frequency usage pattern information corresponding to the electrical appliance B, (Nc1+Nc2+Nc3 . . . Ncx3) entries of time-frequency usage pattern information corresponding to the electrical appliance C and (Nd1+Nd2+Nd3 . . . Ndx4) entries of time-frequency usage pattern information corresponding to the electrical appliance D. On the other hand, the number of entries of the edge usage pattern information generated by the edge detection module 1035b is sixty times of the number of the edge detectors 1036. As a result, the number of the data entries inputted into the information mapping module 1037 is equal to (Na1+ . . . +Nax1)+(Nb1+ . . . +Nbx2)+(Nc1+ . . . +Ncx3)+(Nd1+ . . . Ndx4)+60*(the number of edge detectors).

According to the embodiment of the present invention, the information mapping module 1037 adopts the fully connected layer in deep neural network (DNN) architecture. The time-frequency usage pattern information and the edge usage pattern information serve as input neurons of the information mapping module 1037. The information mapping module 1037 maps (embeds) the input neurons to multiple mapping dimensions. Each mapping dimension undergoes dimensionality reduction to form an encoded data group. The number of the mapping dimensions should be a multiple of the number of timestamps included in one unit processing period Tunit. For example, if the unit processing period Tunit is one hour and the interval between the timestamps is one minute, the number of the mapping dimensions is a multiple of sixty. In addition, the number of the mapping dimensions is less than the total number of the entries of the time-frequency usage pattern information and the edge usage pattern information.

Please refer to FIG. 12, a schematic diagram showing how the information mapping module maps data. In this embodiment, the information mapping module 1037 includes only one internal layer, and the numbers of the input neurons 41*a* and the output neurons 41*b* are Ndin1 and Ndout1, respectively. In practice, addition layer(s) of internal neurons may be added between the input neurons 41*a* and the output neurons 41*b*.

For the information mapping module 1037, the number of input neurons, the number of output neurons, the presence of internal neurons or not, the number of layer for internal neurons and the number of the internal neurons are structure parameters. On the other hand, the weighs of connections between the input/output/internal neurons are auxiliary parameters which can be updated at the training stage STG1. The output neurons 41*b* of the information mapping module 1037 are considered as encoded data which are then reshaped by the encoded data-reshaping module 1038. For example, the encoded data are reshaped to form sixty timestamp encoded data groups corresponding to the sixty timestamps.

In the embodiment, the time series-analyzing module 1039 has bidirectional long short-term memory (BLSTM) architecture and includes a correlation analyzing module 1039*b*, a basis waveform-generating module 1039*c* and a data synthesizing module 1039*d*. The correlation analyzing module 1039*b* and the basis waveform-generating module 1039*c* do not process data related to respective electrical appliances and can be considered as shared layers. On the other hand, the data synthesizing module 1039*d* respectively processes the data corresponding to the electrical appliances A, B, C, and D, and can be considered as the branch layer.

Please refer to FIG. 13, a schematic diagram showing how the correlation analyzing module converts timestamp encoded data groups into past-time correlation sequences and future-time correlation sequences.

The correlation analyzing module 1039*b* uses long short-term memory (LSTM) neurons 90*p* and 90*f* to process the encoded data 71*b* included in each timestamp encoded data group 81 to generate two first-layer time series (first-layer past-time series 901*p* and first-layer future-time series 901*f*).

Taking the timestamp t1 as an example, the correlation analyzing module 1039*b* takes the timestamp encoded data group 81 corresponding to the timestamp t1 as input data for the first-layer past LSTM neuron LSTM1*p*(*t*1) and the first-layer future LSTM neuron LSTM1*f*(*t*1) corresponding to the timestamp t1. The input data for the first-layer past/future LSTM neurons corresponding to other timestamps are obtained in a similar way, and are not repeated herein.

In this diagram, the first-layer past LSTM neurons LSTM1*p*(*t*1)~LSTM1*p*(*t*60) collectively form the first-layer past-time series 901*p*, and the first-layer future LSTM neurons LSTM1*f*(*t*1)~LSTM1*f*(*t*60) collectively form the first-layer future-time series 901*f*. Then, the correlation analyzing module 1039*b* uses the first-layer past LSTM neurons LSTM1*p*(*t*1)~LSTM1*p*(*t*60) to generate Nr1 past-time correlation sequences 94*p*, and uses the first-layer future LSTM neurons LSTM1*f*(*t*1)~LSTM1*f*(*t*60) to generate Nr1 future-time correlation sequences 94*f*.

Afterwards, the correlation analyzing module 1039*b* arranges sixty past-time correlation groups 921, 922, 923 . . . 92*x* side by side in the sequence of the timestamps t1~t60. The columns enclosed with dotted frame represent the past-time correlation groups. Each of the past-time correlation groups 921, 922, 923 . . . 92*x* consists of Nr1 past-time correlation data 91*p*. One entry of past-time correlation data 91*p* is selected from each past-time correlation group 921, 922, 923 . . . 92*x* to form one past-time correlation sequence 94*p*, so as to generate Nr1 past-time correlation sequences 94*p* in total. The lower left portion of FIG. 13 shows the past-time correlation sequence 94*p* wherein the x-axis represents timestamp (t1~t60) and the y-axis represents correlation. The arrows between any two timestamps represent that a timestamp is affected by prior timestamp(s). For example, in the past-time correlation sequence 94*p*, the correlation at the timestamp t3 is affected by the correlation at the timestamps t1 and t2.

The correlation analyzing module 1039*b* uses the first-layer future LSTM neurons LSTM1*f*(*t*1)~LSTM1*f*(*t*60) to generate sixty future-time correlation groups 931, 932, 933 . . . 93*x* corresponding the timestamps t1~t60. Each of the future-time correlation groups 931, 932, 933 . . . 93*x* consists of Nr1 future-time correlation data 91*f*. The columns enclosed with dotted frame represent the future-time correlation groups.

The sixty future-time correlation groups 931, 932, 933 . . . 93*x* are arranged side by side in the sequence of the timestamps t1~t60. Then, one entry of future-time correlation data 91*f* is selected from each future-time correlation group 931, 932, 933 . . . 93*x* to form one future-time correlation sequences 94*f*, so as to generate Nr1 future-time correlation sequences 94*f* in total. The lower right portion of FIG. 13 shows the future-time correlation sequence 94*f* wherein the x-axis represents timestamp (t1~t60) and the y-axis represents correlation. The arrows between any two timestamps represent that a timestamp is affected by posterior timestamp(s).

The correlation analyzing module 1039*b* transmits the Nr1 past-time correlation sequences 94*p* and the Nr1 future-time correlation sequences 94*f* to the basis waveform-generating module 1039*c* as the input of the basis waveform-generating module 1039*c*.

Please refer to FIG. 14, a schematic diagram showing how the basis waveform-generating module converts the past-time correlation sequences and the future-time correlation sequences into past-time waveforms and future-time waveforms, and how the data synthesizing module performs waveform selection and waveform reconfiguration to the basis waveforms to generate the synthesized simulation data of respective electrical appliances. According to the above description, the input data corresponding to each timestamps t1~t60 include Nr1 entries of past-time correlation data 91*p* and Nr1 entries of future-time correlation data 91*f*.

The basis waveform-generating module 1039*c* arranges the past-time correlation data 91*p* and the future-time correlation data 91*f* in the sequence of the timestamps t1~t60, and then defines time correlation groups 941, 942, 943 . . . 94*x* in the sequence of the timestamps t1~t60. Afterwards, the basis waveform-generating module 1039*c* analyzes and processes the time correlation groups 941, 942, 943 . . . 94*x* by BLSTM to generate Nr2 past-time waveforms and Nr2 future-time waveforms. In this embodiment, the past-time waveforms and the future-time waveforms are collectively called common basis waveforms. Therefore, the data synthesizing module 1039*d* retrieves Nr2*2 common basis waveforms from the basis waveform-generating module 1039*c*.

For illustration purposes only, six common basis waveforms 991, 992, 993, 994, 995 and 996 are shown in FIG. 14, but the quantity of the common basis waveforms is not limited to this embodiment in practice. The waveform selecting module 1038*a* selects one or more first appliance basis waveforms corresponding to the electrical appliance A from the common basis waveforms 991~996 (for example, selecting the common basis waveforms 993 and 996), and decides the ratio R1 of each first appliance basis waveform. Then, the waveform synthesizing module 1036*a* combines the first appliance basis waveforms according to the ratio R1 to form the synthesized simulation data doutPa.

Similarly, the waveform selecting module 1038*b* and the waveform synthesizing module 1036*b* can generate the synthesized simulation data doutPb; the waveform selecting module 1038*c* and the waveform synthesizing module 1036*c* can generate the synthesized simulation data doutPc, and the waveform selecting module 1038*d* and the waveform synthesizing module 1036*d* can generate the synthesized simulation data doutPd.

The method with reference to FIGS. 9~14 can be used at the training stage STG1, the testing stage STG2 and the model application mode M2. At the training stage STG1, the model evaluation device 105 compares the synthesized simulation data doutPa, doutPb, doutPc and doutPd with the respective verification data dvrPa, dvrPb, dvrPc and dvrPd to find the similarity between them. Then, the model building device 103 updates the auxiliary parameters according to the similarity. At the testing stage STG2, the model evaluation device 105 compares the synthesized simulation data doutPa, doutPb, doutPc and doutPd with the respective verification data dvrPa, dvrPb, dvrPc and dvrPd to find the similarity between them. Then, the model building device 103 adjusts the structure parameters according to the similarity. The model evaluation device 105 is disabled in the model application mode M2, and the data-gathering and analyzing device 15 directly receives the synthesized simulation data doutPa, doutPb, doutPc and doutPd from the model building device 103.

According to the concept of the present invention, at first, the loading disaggregation system 10 builds the disaggregation model in the model building mode M1. After the disaggregation model is built, the disaggregation model needs only the total raw data outputted from the total electricity meter of the ordinary electricity user to generate the synthesized simulation data of respective electrical appliances of the ordinary user. In other words, respective electrical meters are not required to install to houses of the ordinary users, and it could accurately estimate the usage behavior of specific electrical appliance. The analysis method can be applied to a large number of residences or electricity users to analyze the electricity usage behavior of the electrical appliances at low cost by collecting total raw data outputted form the total electricity meters in connection with the ordinary electricity users.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A model building device for disaggregating total aggregated data outputted from a total electricity meter and measured during a unit processing period, the unit processing period comprising a plurality of timestamps, the model building device comprising:
a usage pattern-analyzing module configured for receiving the total aggregated data, analyzing time-frequency information and an edge triggering state of the total aggregated data based on a plurality of detection conditions comprising an edge detection condition, and generating a plurality of entries of usage pattern information representing a plurality of temporal profiles and a plurality of powering states of a first electrical appliance and a second electrical appliance during the unit processing period, wherein the usage pattern-analyzing module comprises:
an edge detection module, configured for analyzing the total aggregated data based on the edge detection condition by respectively centering each of the timestamps in a predetermined receptive field covering at least some of the plurality of timestamps, and generating a plurality of entries of edge usage pattern information corresponding to the timestamps being respectively centered, wherein the time-frequency information is used to evaluate the temporal profiles, and the edge triggering state is used to detect the powering states;
an information mapping module electrically connected to the usage pattern-analyzing module, configured for mapping the usage pattern information to form a plurality of entries of encoded data having a plurality of mapping dimensions correspondingly; and
a time series-analyzing module electrically connected to the information mapping module, configured for analyzing time correlation of the encoded data according to the corresponding timestamps to generate first synthesized simulation data and second synthesized simulation data wherein the first synthesized simulation data and the second synthesized simulation data correspond to the first electrical appliance and the second electrical appliance used during the unit processing period, respectively.

2. The model building device according to claim 1, wherein the detection conditions further comprises a plurality of first time-frequency filter parameters corresponding to the first electrical appliance and a plurality of second time-frequency filter parameters corresponding to the second electrical appliance, the usage pattern-analyzing module comprising:
a time-frequency detection module, comprising:
a plurality of first time-frequency detectors configured for analyzing the total aggregated data according to the first time-frequency filter parameters to generate a plurality of entries of first time-frequency usage pattern information; and
a plurality of second time-frequency detectors configured for analyzing the total aggregated data according to the second time-frequency filter parameters to generate a plurality of entries of second time-frequency usage pattern information.

3. The model building device according to claim 1, wherein the number of the mapping dimensions is a multiple of the number of the timestamps in the unit processing period, and the number of the mapping dimensions is less than the number of the entries of the usage pattern information.

4. The model building device according to claim 1, wherein the time series-analyzing module comprises:
 a correlation analyzing module configured for generating a plurality of first-layer past-time long short-term memory neurons and a plurality of first-layer future-time long short-term memory neurons corresponding to the timestamps,
 wherein the correlation analyzing module generates a plurality of past-time correlation sequences according to a first-layer past-time series consisting of the first-layer past-time long short-term memory neurons, and generates a plurality of future-time correlation sequences according to a first-layer future-time series consisting of the first-layer future-time long short-term memory neurons.

5. The model building device according to claim 4, wherein the past-time correlation sequences and the future-time correlation sequences collectively form the time correlation sequences, the time series-analyzing module further comprising:
 a basis waveform-generating module electrically connected to the correlation analyzing module, configured for generating a plurality of past-time waveforms and a plurality of future-time waveforms which are collectively defined as a plurality of common basis waveforms.

6. The model building device according to claim 5, wherein the time series-analyzing module further comprises:
 a data synthesizing module electrically connected to the basis waveform-generating module, and comprising:
  a plurality of waveform selecting modules electrically connected to the basis waveform-generating module, configured for selecting a portion of the common basis waveforms as a plurality of first appliance basis waveforms corresponding to the first electrical appliance, and selecting another portion of the common basis waveforms as a plurality of second appliance basis waveforms corresponding to the second electrical appliance; and
  a plurality of waveform synthesizing modules electrically connected to the waveform selecting modules correspondingly, configured for generating the first synthesized simulation data by combining the first appliance basis waveforms, and generating the second synthesized simulation data by combining the second appliance basis waveforms.

7. The model building device according to claim 6, wherein the waveform selecting modules comprises:
 a first waveform selecting module configured for selecting the first appliance basis waveforms from the common basis waveforms, and determining a first ratio of each of the first appliance basis waveforms, wherein the first synthesized simulation data are formed by combining the first appliance basis waveforms according to the first ratio.

8. The model building device according to claim 1, further comprising:
 a training batch-determination module configured for dividing a plurality of augmented data received from a data processing device into a plurality of batches, wherein the augmented data comprises total augmented data, first augmented data and second augmented data corresponding to the total aggregated data, the first electrical appliance and the second electrical appliance, respectively.

9. A loading disaggregation system receiving total raw data outputted from a total electricity meter, first respective raw data outputted from a first respective electricity meter corresponding to a first electrical appliance and second respective raw data outputted from a second respective electricity meter corresponding to a second electrical appliance wherein the total raw data, the first respective raw data and the second respective raw data are measured during a unit processing period, the loading disaggregation system comprising:
 a data processing device configured for processing the total raw data, the first respective raw data and the second respective raw data to generate total aggregated data, first respective verification data and second respective verification data, respectively, wherein the unit processing period comprises a plurality of timestamps;
 a model building device electrically connected to the data processing device, comprising:
  a usage pattern-analyzing module configured for receiving the total aggregated data, analyzing time-frequency information and an edge triggering state of the total aggregated data based on a plurality of detection conditions comprising an edge detection condition, and generating a plurality of entries of usage pattern information representing a plurality of temporal profiles and a plurality of powering states of the first electrical appliance and the second electrical appliance during the unit processing period, wherein the usage pattern-analyzing module comprises:
   an edge detection module, configured for analyzing the total aggregated data based on the edge detection condition by respectively centering each of the timestamps in a predetermined receptive field covering at least some of the plurality of timestamps, and generating a plurality of entries of edge usage pattern information corresponding to the timestamps being respectively centered, wherein the time-frequency information is used to evaluate the temporal profiles, and the edge triggering state is used to detect the powering states;
  an information mapping module electrically connected to the usage pattern-analyzing module, configured for mapping the usage pattern information to form a plurality of entries of encoded data; and
  a time series-analyzing module electrically connected to the information mapping module, configured for analyzing time correlation of the encoded data according to the timestamps to generate first synthesized simulation data and second synthesized simulation data wherein the first synthesized simulation data and the second synthesized simulation data correspond to the first electrical appliance and the second electrical appliance, respectively; and
 a model evaluation device electrically connected to the data processing device and the model building device, configured for receiving the first respective verification data and the second respective verification data from the data processing device, receiving the first synthesized simulation data and the second synthesized simulation data from the model building device, comparing the first respective verification data with the first synthesized simulation data to obtain a first similarity between the first respective verification data and the first synthesized simulation data, and comparing the second respective verification data with the second synthesized simulation data to obtain a second similarity between the second respective verification data and the second synthesized simulation data.

10. The loading disaggregation system according to claim 9, wherein the loading disaggregation system operates in a model building mode or a model application mode, the loading disaggregation system operating at a training stage or a testing stage when the loading disaggregation system operates in the model building mode,
- wherein the loading disaggregation system enables the data processing device, the model building device and the model evaluation device in the model building mode,
- wherein the loading disaggregation system enables the data processing device and the model building device, and disables the model evaluation device in the model application mode.

11. The loading disaggregation system according to claim 9, wherein the data processing device comprises:
- a data processing module, comprising:
  - a data sampling module configured for sampling the total raw data, the first respective raw data and the second respective raw data based on a sampling cycle to generate a plurality of entries of total sampling data, a plurality of entries of first respective sampling data and a plurality of entries of second respective sampling data, respectively; and
  - a preprocessing module electrically connected to the data sampling module, configured for preprocessing the total sampling data, the first respective sampling data and the second respective sampling data to generate a plurality of entries of total preprocessed data, a plurality of entries of first respective preprocessed data and a plurality of entries of second respective preprocessed data,
- wherein the entries of the total sampling data, the entries of the first respective sampling data, the entries of the second respective sampling data, the entries of the total preprocessed data, the entries of the first respective preprocessed data and the entries of the second respective preprocessed data are equal in quantity.

12. The loading disaggregation system according to claim 11, wherein the data processing device further comprises:
- a data balance module electrically connected to the preprocessing module, configured for performing bootstrapping on the total preprocessed data, the first respective preprocessed data and the second respective preprocessed data according usage behavior of the first electrical appliance and the second electrical appliance to generate a plurality of entries of total balanced data, a plurality of entries of first respective balanced data and a plurality of entries of second respective balanced data,
- wherein the number of the entries of the total balanced data is greater than the number of the entries of the total preprocessed data,
- wherein the entries of the total balanced data, the entries of the first respective balanced data and the entries of the second respective balanced data are equal in quantity.

13. The loading disaggregation system according to claim 12, wherein the data processing device further comprises:
- a data augmentation module electrically connected to the data balance module, configured for augmenting the total balanced data, the first respective balanced data and the second respective balanced data according to at least a data augmentation rrule to generate a plurality of entries of total augmented data, a plurality of entries of first respective augmented data and a plurality of entries of second respective augmented data, respectively,
- wherein the number of the entries of the total augmented data is greater than the number of the entries of the total balanced data,
- wherein the entries of the total augmented data, the entries of the first respective augmented data and the entries of the second respective augmented data are equal in quantity.

* * * * *